Oct. 24, 1939.  E. M. CADWALLADER  2,176,885
MINING APPARATUS
Filed July 14, 1937  13 Sheets-Sheet 1

Inventor
Edgar M. Cadwallader,
By Wray N. Hoffman
Attorney

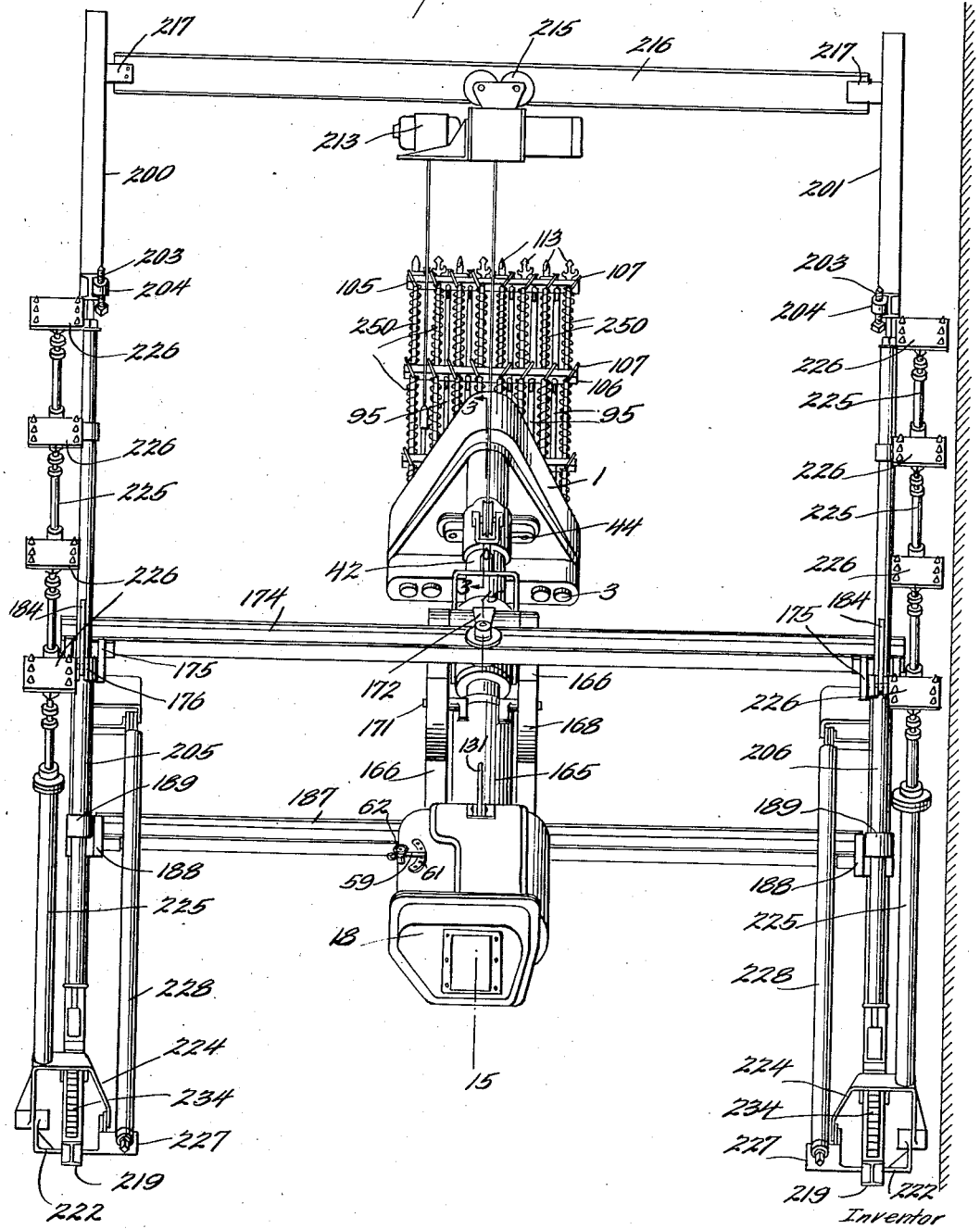

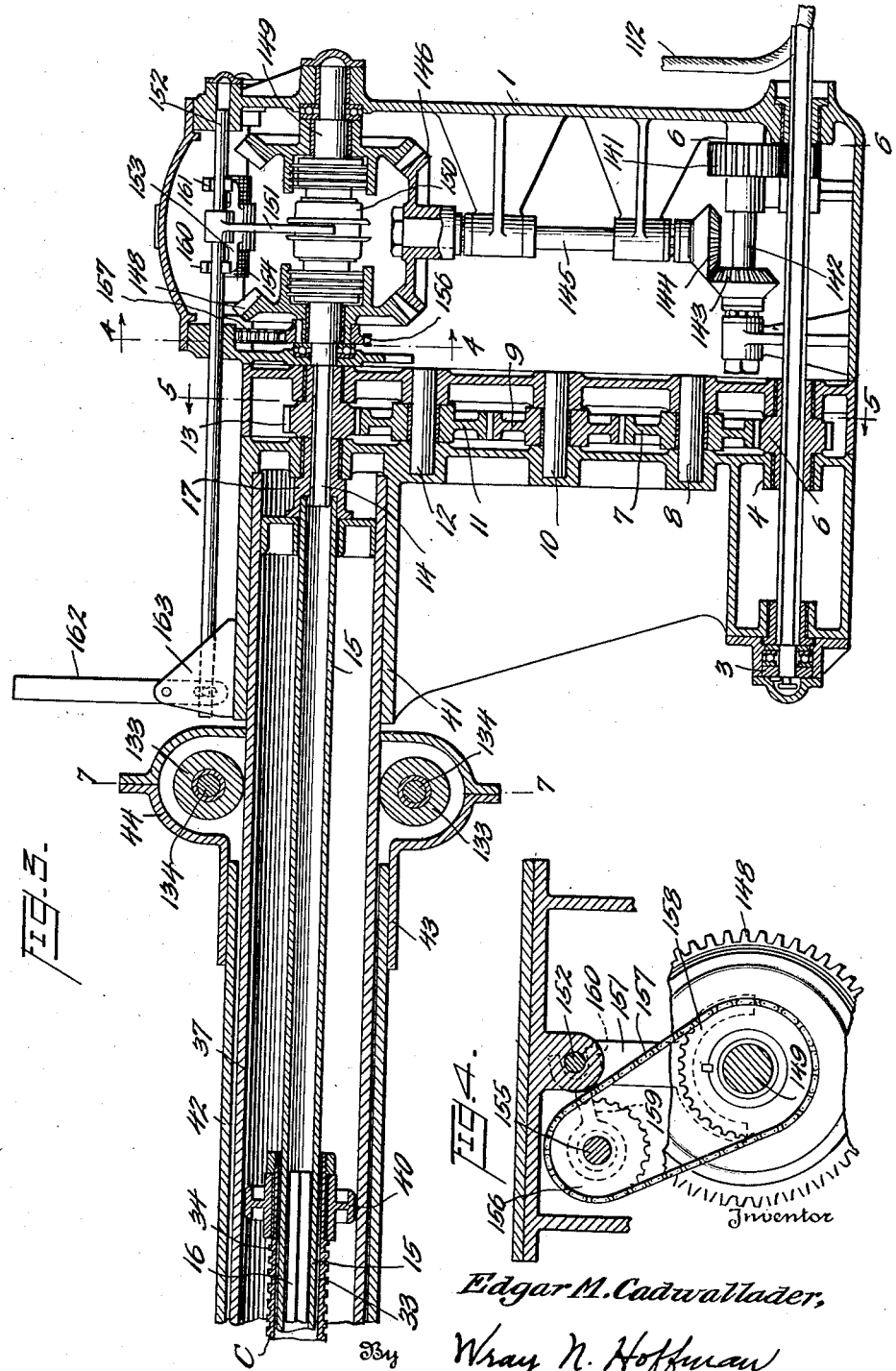

Oct. 24, 1939.　　　E. M. CADWALLADER　　　2,176,885
MINING APPARATUS
Filed July 14, 1937　　　13 Sheets-Sheet 4
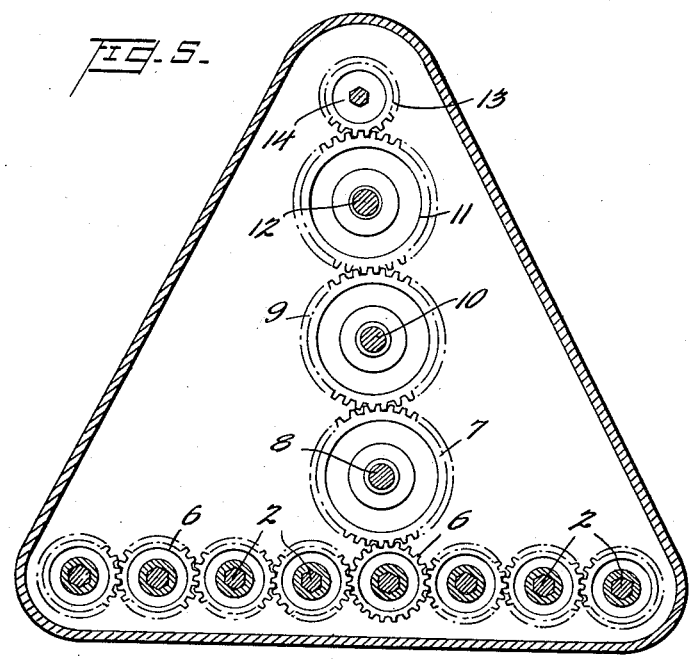
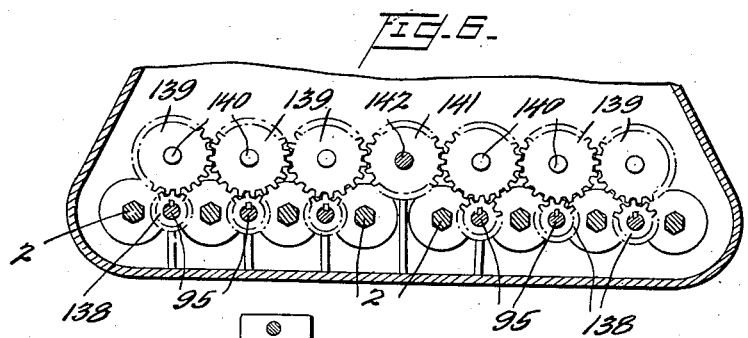
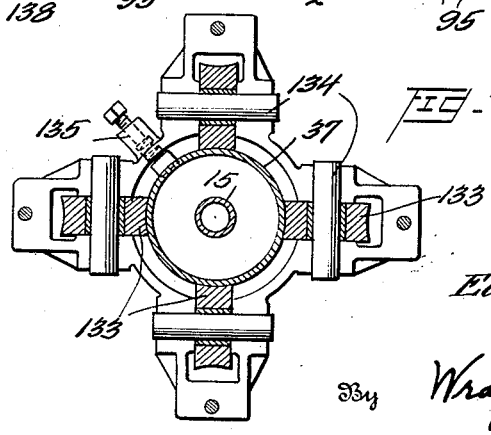
Inventor
Edgar M. Cadwallader
By Wray N. Hoffman
Attorney

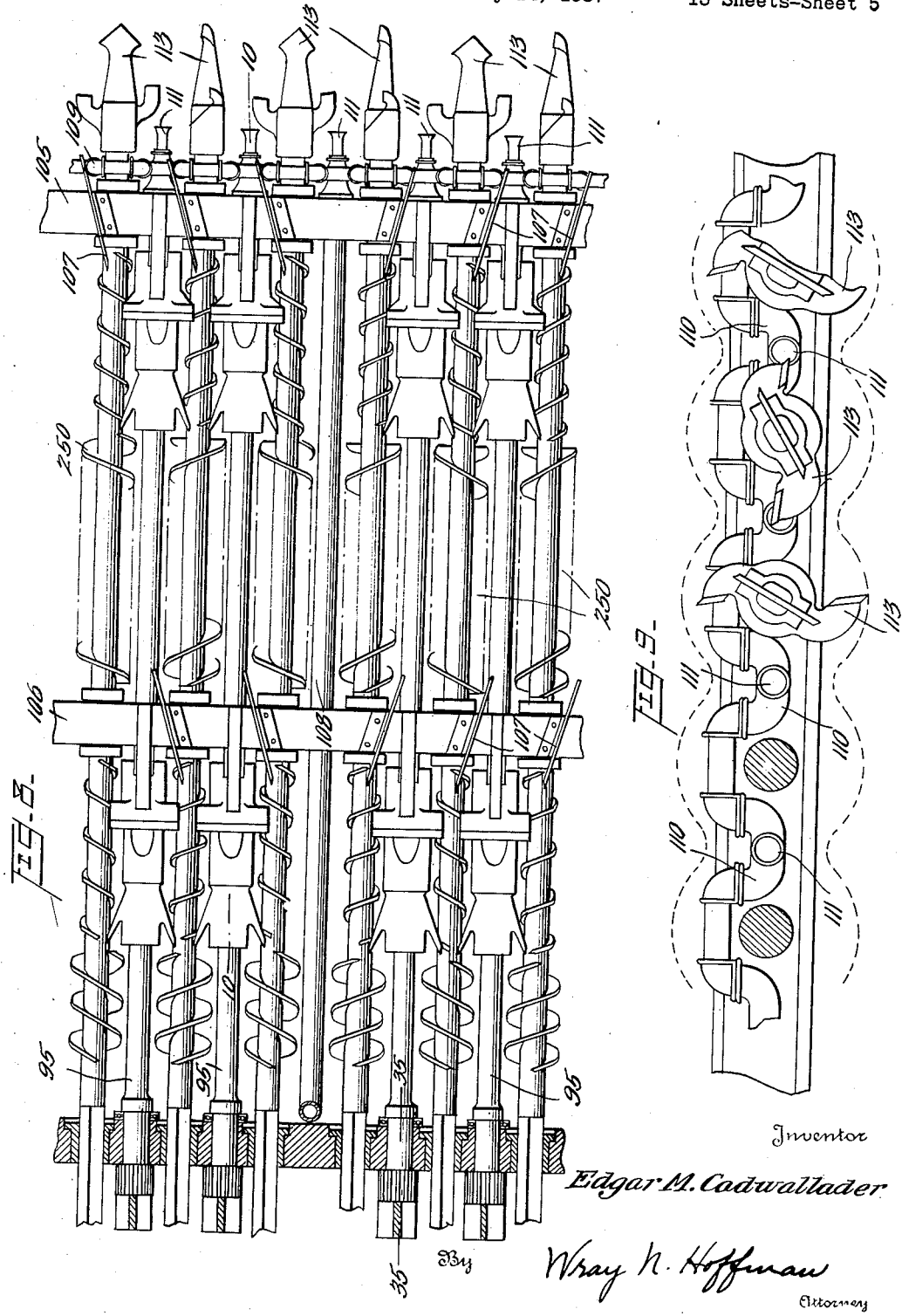

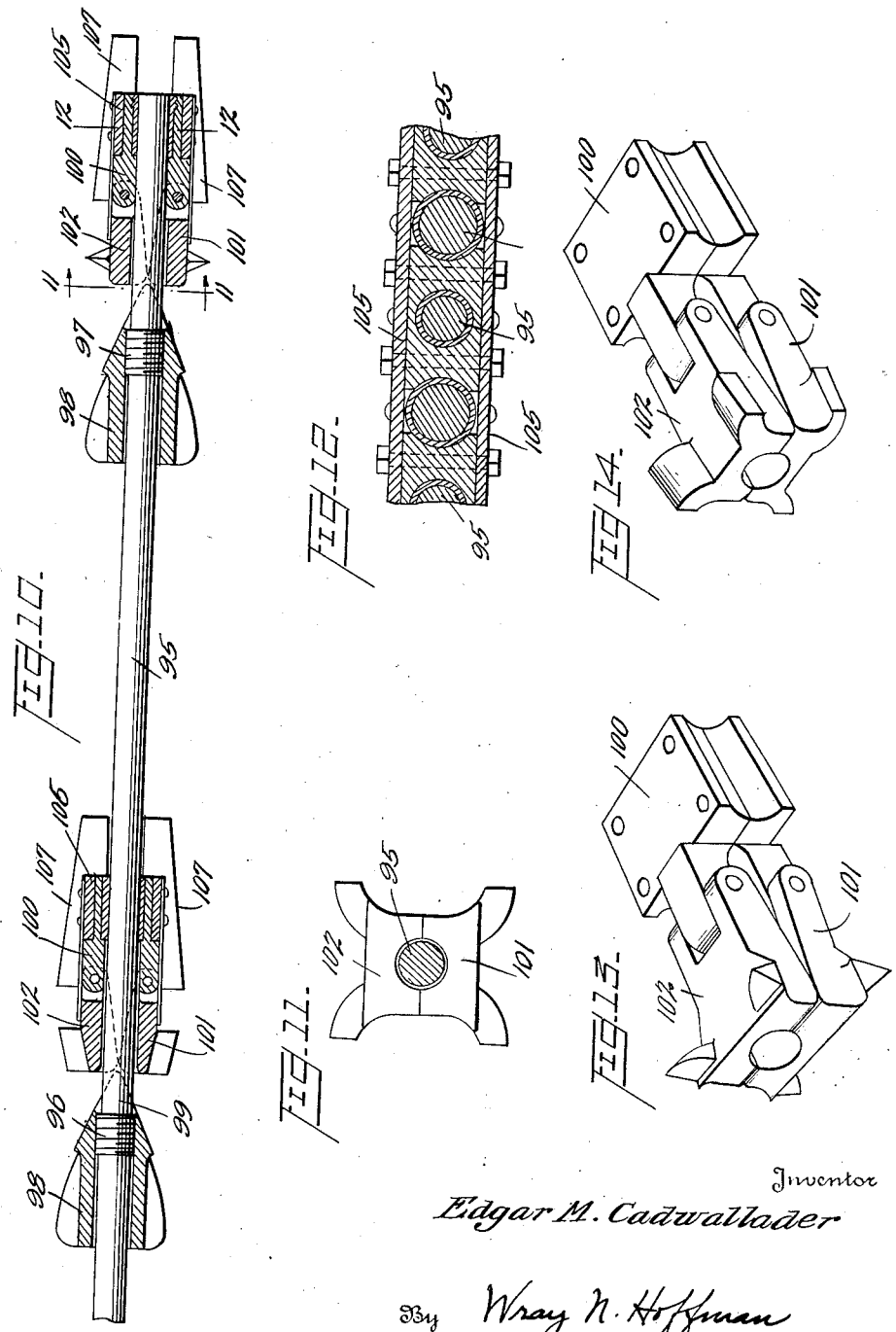

Oct. 24, 1939.  E. M. CADWALLADER  2,176,885
MINING APPARATUS
Filed July 14, 1937   13 Sheets-Sheet 7
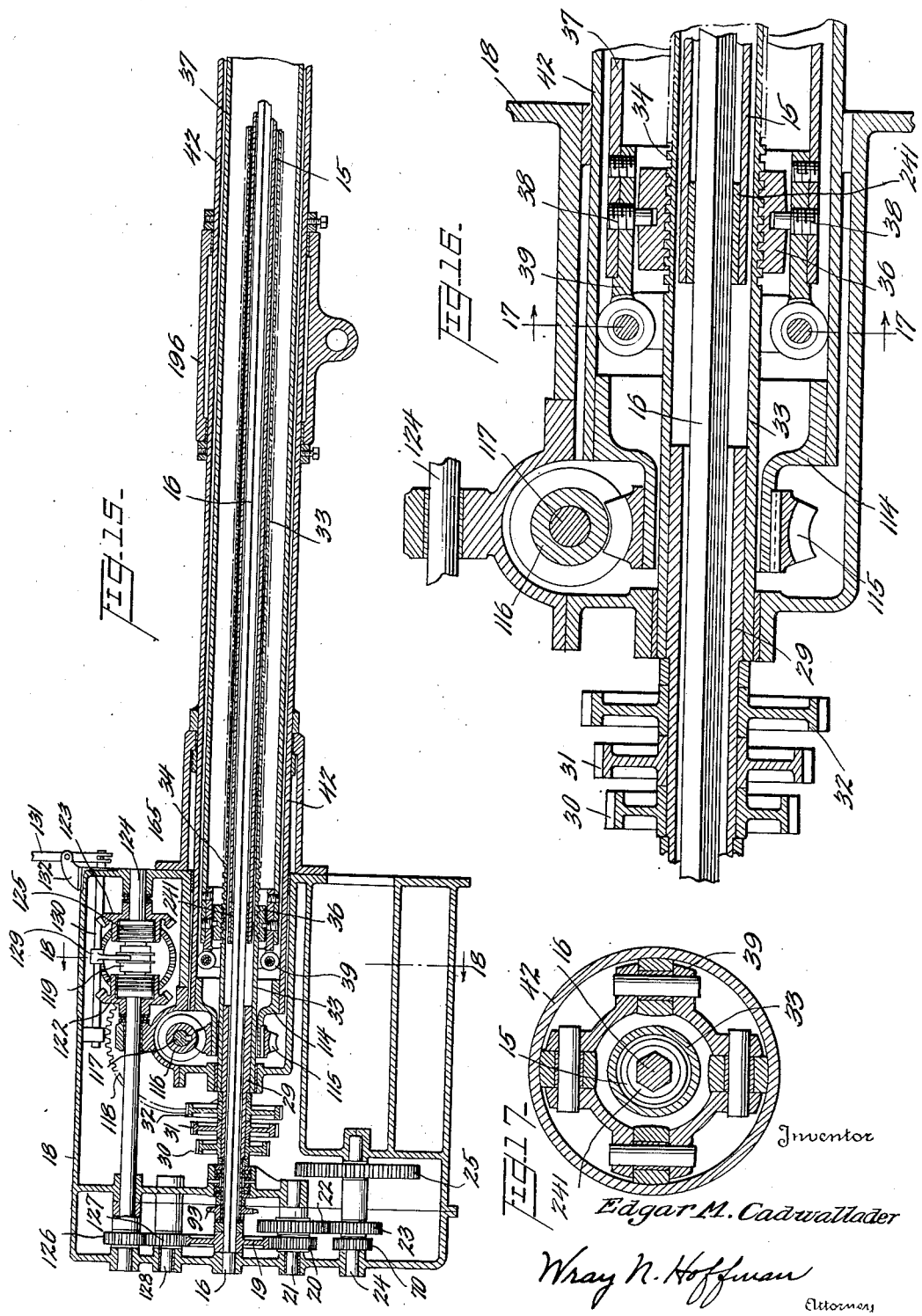

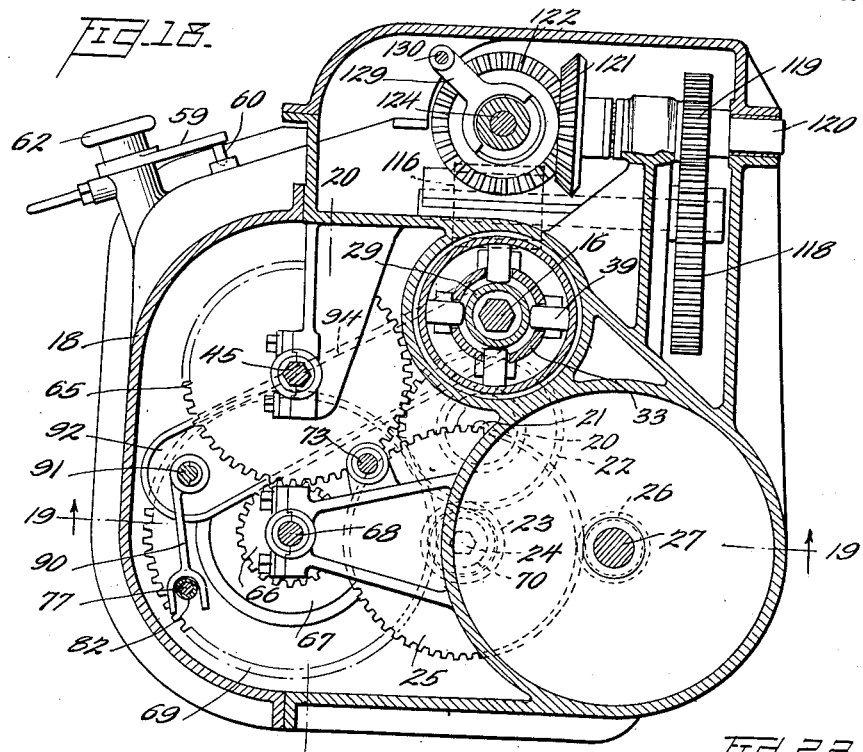
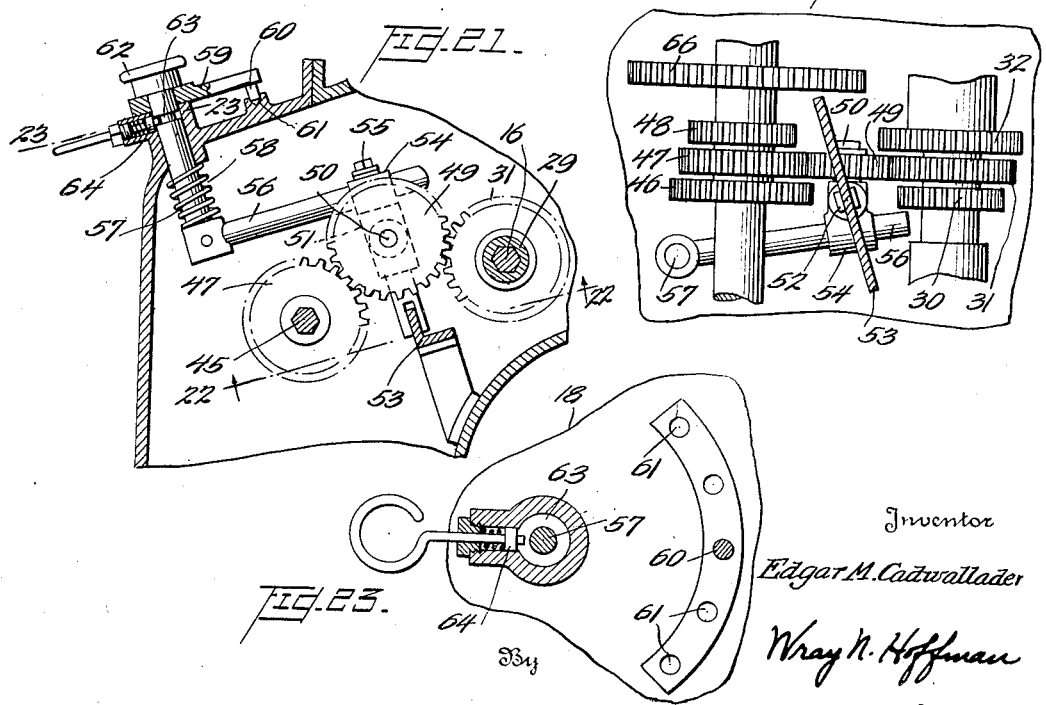

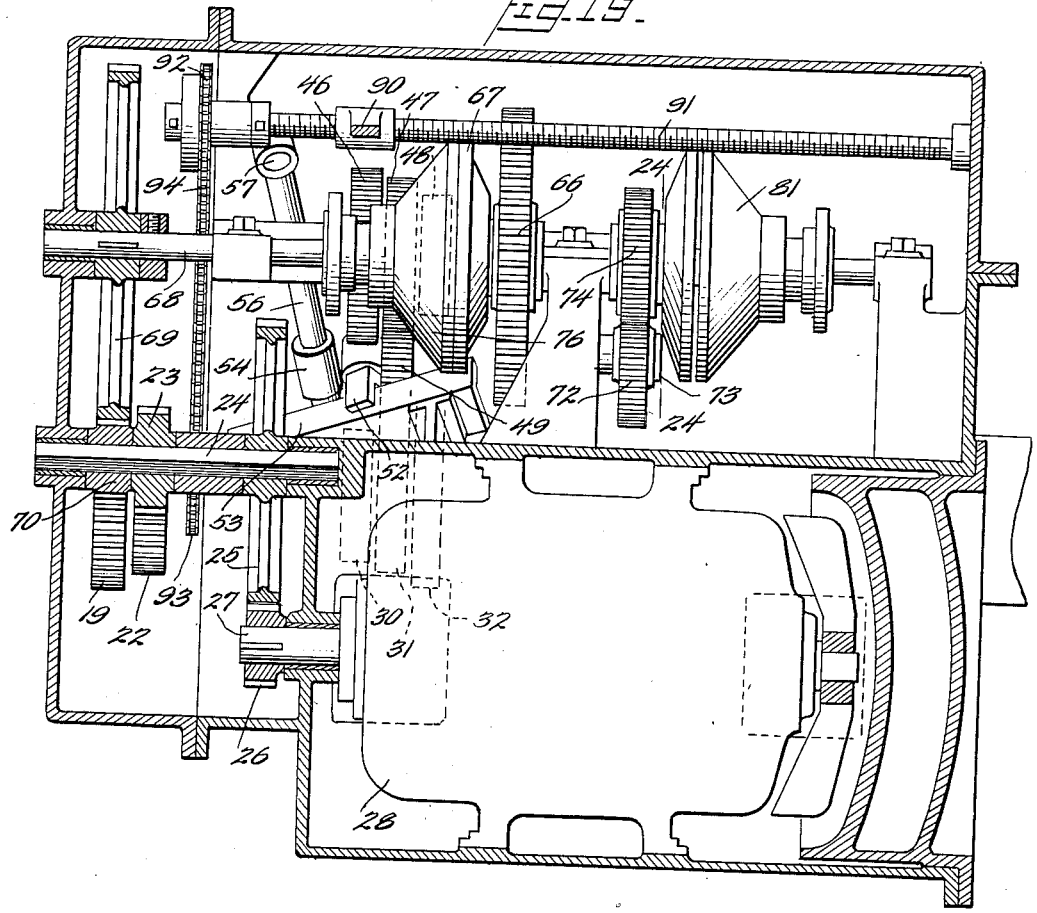
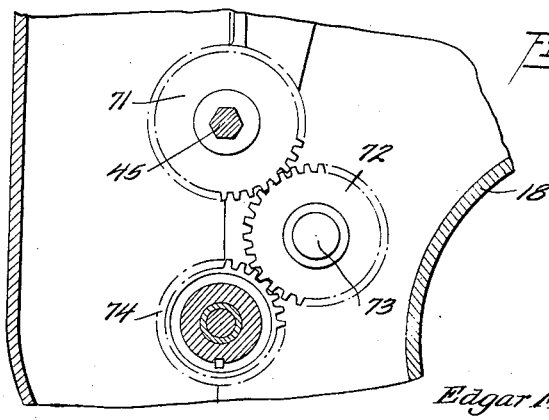

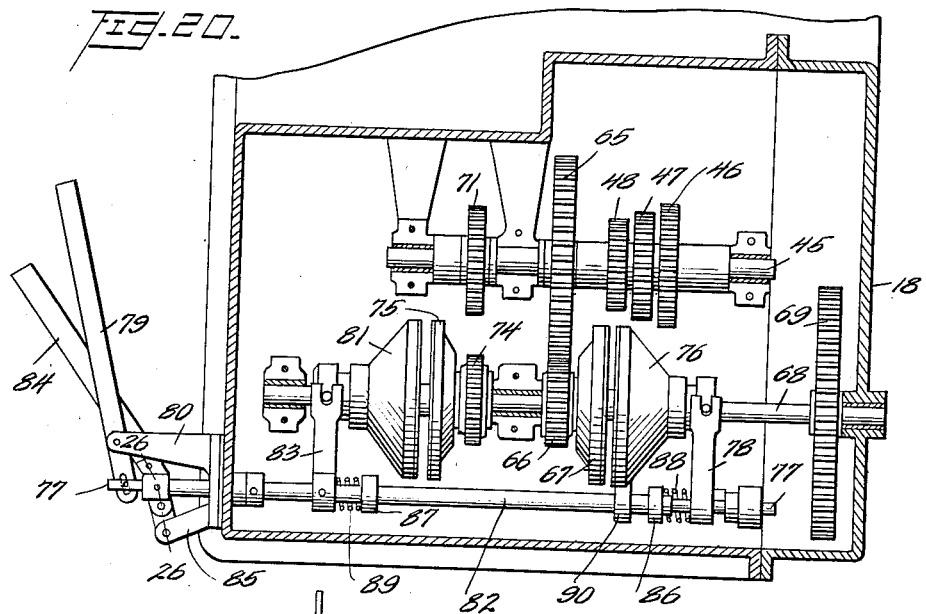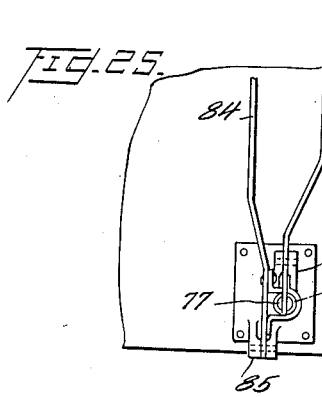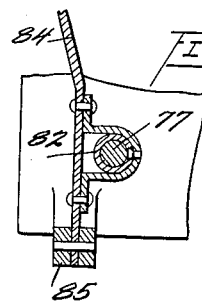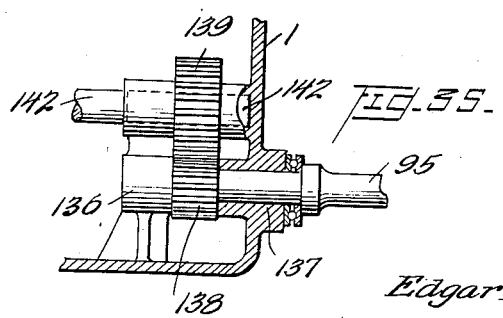

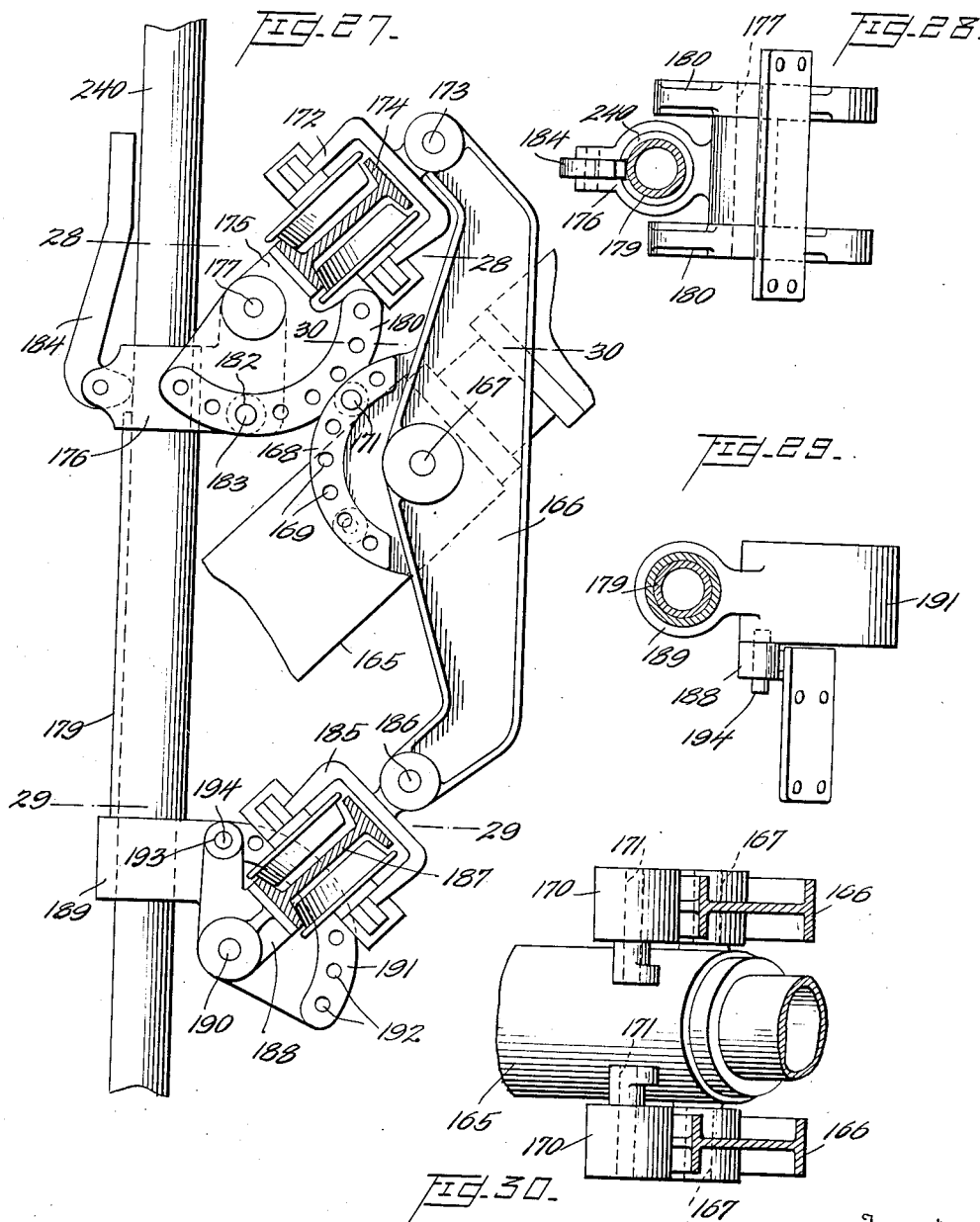

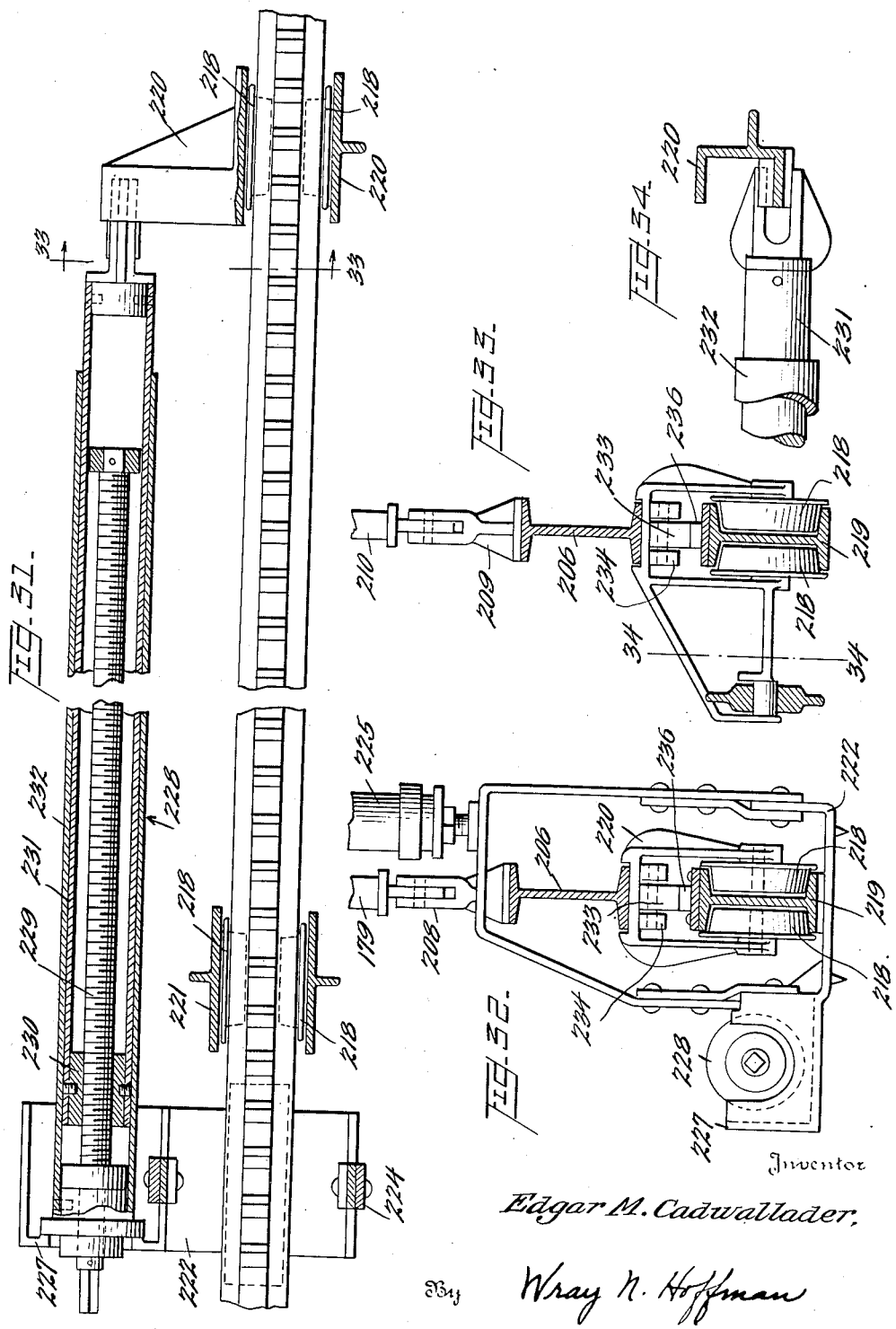

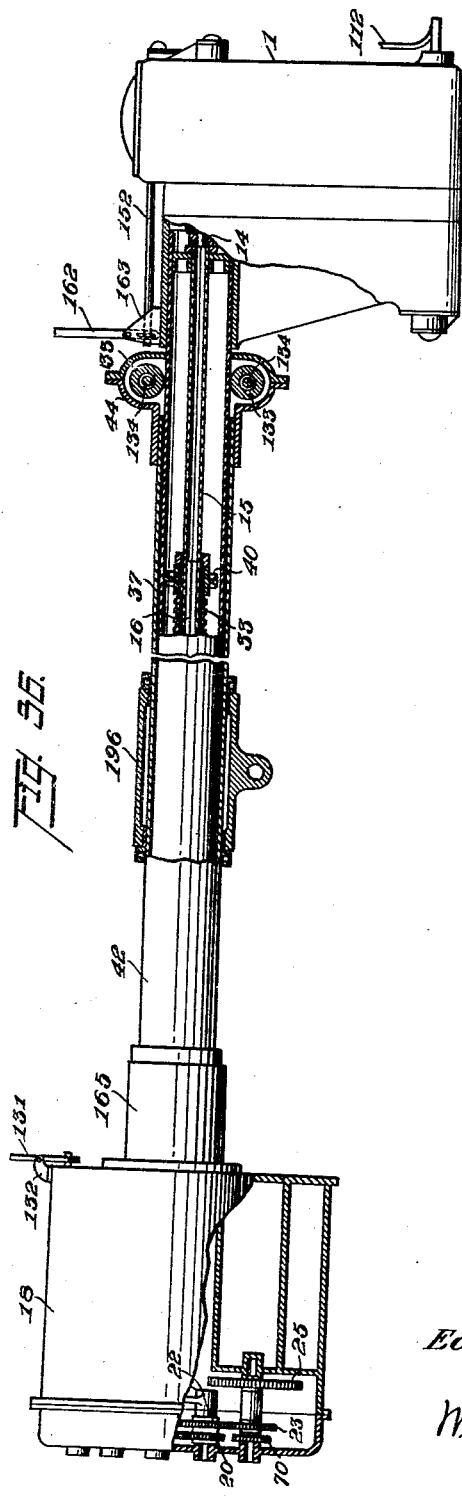

Patented Oct. 24, 1939

2,176,885

UNITED STATES PATENT OFFICE 2,176,885

MINING APPARATUS

Edgar M. Cadwallader, Cleveland, Ohio, assignor to Mineral Cutting Machine Company, Inc., Cleveland, Ohio, a corporation of Delaware Application July 14, 1937, Serial No. 153,659

45 Claims. (Cl. 262—22)

This invention relates to an apparatus for the mining of coal or similar mineral. More particularly it has to do with the pitch mining of hard coal or similar mineral.

Pitch mining as now practiced consists in drilling holes into the face of working breast of the coal strata or vein at suitably spaced points, filling each hole with a charge of explosive, and then setting off such charges. Thus, the coal is broken away from the face or breast by blasting. In this method the degree of impact and shattering power of the blast is dependent upon the skill of the miner in selecting the proper relative positions of each hole, in drilling the holes to the proper depth, in employing the correct amount of the explosive charge, and in tamping the charge properly in each of the holes. It will be apparent that if great care and skill are not exercised by the miner, a blasting effect will result which is of such intensity and repercussion as to cause severe fractures in the lateral ribs and cave-ins in the roof and shatter the coal into a relatively high percentage of small particles of a size known as undersized coal or fines.

In the blasting method of pitch mining, the coal is blasted primarily from the central portion of the breast, leaving portions of the coal depending from the roof and protruding from the lateral ribs. In order to maintain the breast or face of uniform fracture, it is necessary to remove such portions, and this can only be done by hand operated wedges, sledges, or picks. The blasting causes an undue amount of smoke and coal dust which are not only injurious to the health of the workmen, but also unduly tax the system of ventilation. In addition, there is the grave danger of gas explosions and consequent fires which result in many injuries or fatalities to the workmen. Then also, as it is not possible to dislodge the coal from the entire area of the breast or face by blasting without causing some damage to the roof and the lateral ribs, it is necessary to continually reinforce the roof by means of upright timbers and collars so as to protect the workmen from injury or fatality due to the falling of pieces or sections of the roof. The bringing of the timber required for this purpose to the working breast is an extremely difficult and burdensome task for the workmen because of its great weight.

Accordingly, an object of the present invention is to provide an apparatus for the mining of coal or similar mineral which is capable of performing all the operations incident to the mining of coal or similar mineral from the working breast without the use of explosives.

Another object of the present invention is to provide an apparatus for the mining of coal or similar mineral whereby the coal or mineral is broken away from the working breast or face with the avoidance of the dust and gas explosion hazards.

Another object of the present invention is to provide an apparatus for the mining of coal or similar mineral whereby the coal or similar mineral is broken away and dislodged by the application to the walls of contiguous communicating areas formed in the working breast at a point spaced from an undercut and side cut and in a plane substantially parallel with the pitch of the floor of the vein at points intermediate the axes of said areas of expansive forces which in themselves are of such magnitude as to break away the coal or mineral in the region of such areas in sizable pieces with a minimum of fines and undersized particles with the avoidance of dust and the elimination of sparks.

A further object of the present invention is to provide an apparatus for the mining of coal or similar mineral whereby water is applied to a plurality of boring elements while working in the face of a breast of coal or mineral to form contiguous communicating areas in such manner as to allay the dust induced by the action of the boring elements and to quench any sparks which may be produced by the boring elements striking spar.

A still further object of the present invention is to provide an apparatus for the mining of coal or similar mineral whereby the cuttings produced by the action of a plurality of boring elements in forming contiguous communicating areas in the face of the breast of coal or mineral are prevented from collecting within said areas.

A still further object of the present invention is to provide an apparatus for the mining of coal or similar mineral which includes a means for actuating the expansive force inducing elements.

A still further object of the present invention is to provide an apparatus for the mining of coal or similar mineral wherein the combined boring and expansive force inducing elements assembly includes a dust and spark allaying means.

A still further object of the present invention is to provide an apparatus for the mining of coal or similar mineral wherein the combined boring and expansive force inducing element assembly is shiftable to any desired angular position.

A still further object of the present invention is to provide an apparatus for the mining of coal or similar mineral which includes a mechanically operated means for shifting the unit including the plurality of boring elements, to a position such that the boring elements will be either in a horizontal or vertical plane.

A still further object of the present invention is to provide an apparatus for the mining of coal or similar mineral which includes means for rigidly maintaining the unit comprisng the boring elements in its adjusted angular position with relation to the pitch of the floor of the vein and for counteracting the back pressure caused by the working of the boring elements in the breast of coal or mineral.

A still further object of the present invention is to provide an apparatus for the mining of coal or similar mineral which includes means for supporting it as a unit in the vein adjacent the face or working breast of the coal or mineral to be mined.

Other objects and advantages will be apparent as the invention is described in greater detail in connection with the accompanying drawings wherein:

Figure 2 is a plan view of the apparatus shown in Figure 1.

Figure 3 is a vertical longitudinal sectional view taken on the line 3—3 of Figure 2, showing the mechanism for actuating the boring elements and the elements for inducing the expansive forces.

Figure 4 is a sectional view taken on the line 4—4 of Figure 3, showing the drive for the automatic clutch throw-out.

Figure 5 is a sectional view taken on the line 5—5 of Figure 3, showing the mechanism for rotating the boring elements.

Figure 6 is a sectional view taken on the line 6—6 of Figure 3, showing the mechanism for actuating the elements for inducing the expansive forces.

Figure 7 is a sectional view taken on the line 7—7 of Figure 3, showing the means for guiding and holding the combined apparatus embodying the boring elements and elements for inducing expansive forces and the actuating mechanism therefor in its fixed adjusted position with respect to the face of the breast of coal or mineral.

Figure 8 is an enlarged plan view, showing the boring and expansive force inducing element assembly.

Figure 9 is an enlarged end view, partially in section, of the assembly of Figure 8, illustrating the relative positions of both the boring elements and the expansive force inducing elements when operating in the coal in the breast, and the type of contiguous communicating areas shown by the dotted lines which are formed as a result of the combined action of such elements.

Figure 10 is a sectional view taken on the line 10—10 of Figure 8, showing one of the elements for inducing expansive forces.

Figure 11 is a sectional view taken on the line 11—11 of Figure 10 showing the shape of the front expansive force inducing member.

Figure 12 is a sectional view taken on the line 12—12 of Figure 10 showing the means for attaching the jaw member portions of the expansive force applying members to the guide bars.

Figure 13 is a detailed perspective view of the front expansive force inducing member.

Figure 14 is a detailed perspective view of the rear expansive force inducing member.

Figure 1:
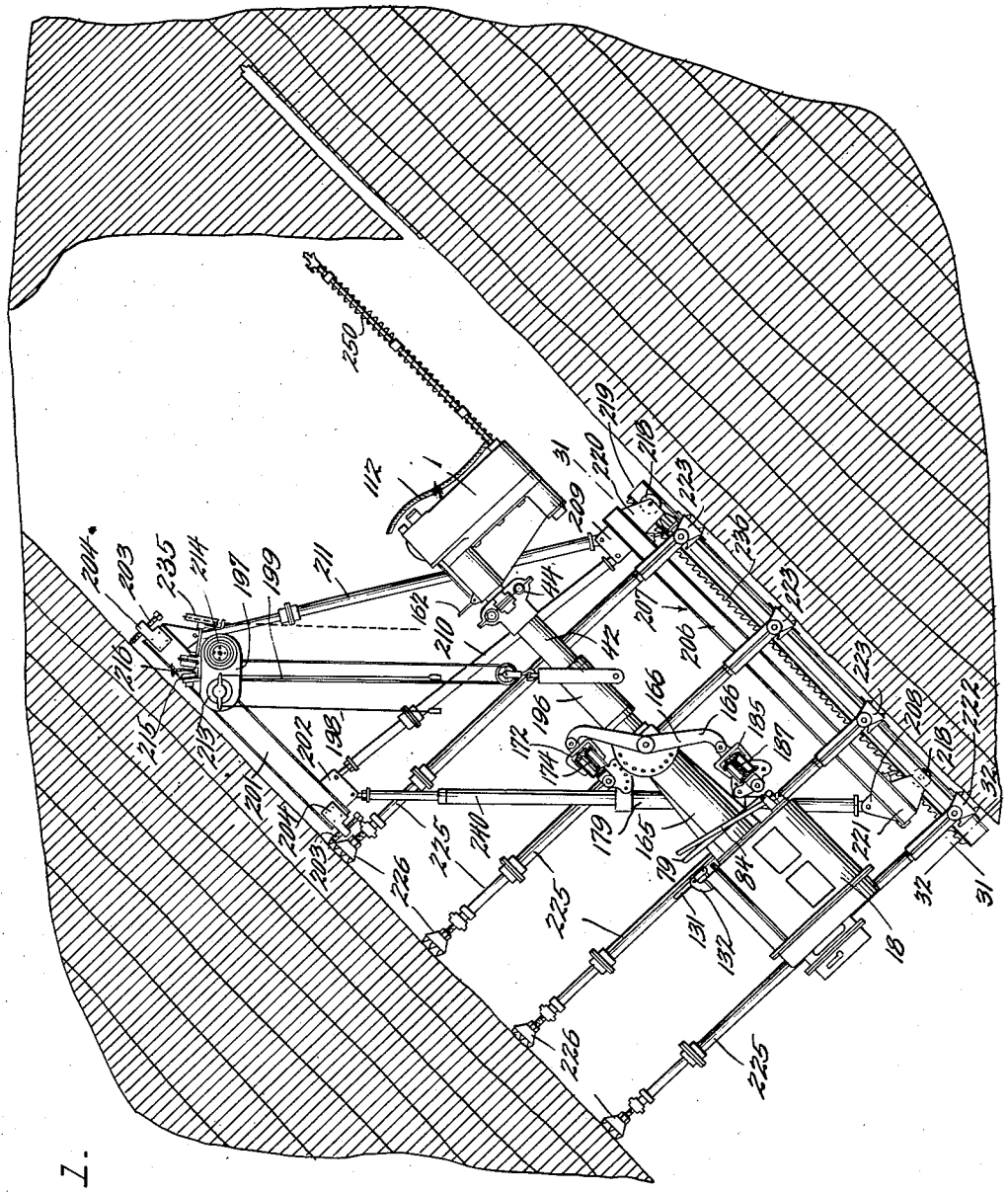
Figure 1 is a side elevation showing the apparatus according to the present invention in operative position in a coal or mineral vein of the pitch type.

Figure 15 is a longitudinal sectional view taken on the line 15—15 of Figure 2, showing the gear assembly for connecting the mechanism for rotating the boring elements and for feeding the boring and expansive force inducing elements forward and backward to the motor shaft, the tubular means for connecting the shaft for rotating the boring elements and for feeding the boring and expansive force inducing elements forward and backward with the gearing for rotating the boring elements shown in Figure 3, and the mechanism for moving the boring and expansive force inducing elements as a unit to any desired position.

Figure 16 is an enlarged sectional view showing the mechanism for feeding the boring and expansive force inducing elements apparatus forward and backward, and means for rotating such apparatus as a unit.

Figure 17 is a sectional view taken on the line 17—17 of Figure 16.

Figure 18 is a vertical sectional view taken on the line 18—18 of Figure 15 showing the gear assembly for feeding the boring and expansive force inducing elements forward and backward.

Figure 19 is a horizontal sectional view taken on the line 19—19 of Figure 18, showing the mechanism for rotating the boring elements, and the mechanism for feeding the boring and expansive force inducing elements toward and away from the breast of coal or mineral.

Figure 20 is a vertical longitudinal sectional view taken on the line 20—20 of Figure 18.

Figure 21 is a detailed vertical sectional view of the upper left hand portion of Figure 18 showing the speed change shifting means.

Figure 22 is a detailed sectional view taken on the line 22—22 of Figure 21, showing the nest of driven gears in association with the speed change gear.

Figure 23 is a detailed sectional view taken on the line 23—23 of Figure 21, showing the mechanism for locking the speed change gear in its adjusted position.

Figure 24 is a detailed sectional view taken on the line 24—24 of Figure 19, showing the mechanism for reversing the rotation of the shaft for feeding the boring and expansive force inducing elements forward.

Figure 25 is a partial detailed end view of Figure 20, showing the levers for operating the forward and reverse clutches.

Figure 26 is an enlarged sectional view taken on the line 26—26 of Figure 20, showing the connection between the lever and the rod for operating the reverse clutch.

Figure 27 is an enlarged elevational view of the mechanism for supporting the boring and expansive force inducing element apparatus as a unit in the vein.

Figure 28 is a plan view taken approximately on the line 28—28 of Figure 27, showing the connection of the upper bracket with its complemental member.

Figure 29 is a plan view of the lower bracket taken on the line 29—29 of Figure 27.

Figure 30 is a sectional view taken on the line

30—30 of Figure 27 showing the connection of the tubular member of the boring and expansive force inducing element apparatus to the wing bracket.

Figure 31 is an enlarged plan view taken on the line 31—31 of Figure 1, showing the jack for moving the carriage along the tracks.

Figure 32 is an enlarged sectional view taken on the line 32—32 of Figure 1, showing the mounting of the carriage supporting the machine upon the tracks and the mechanism for moving the carriage along the tracks.

Figure 33 is a sectional view taken on the line 33—33 of Figure 31, showing the connection of the jack with the carriage.

Figure 34 is a sectional view taken on the line 34—34 of Figure 33, showing the specific manner of attaching the jack to the carriage frame.

Figure 35 is an enlarged sectional view taken on the line 35—35 of Figure 8, showing in detail the actuating mechanism for one of the expansive force inducing elements.

Figure 36 is a longitudinal sectional view of the boring and expansive force inducing element apparatus.

Referring to the drawings, the numeral 1 designates a housing from which protrude a series of boring elements 2, said elements being rotatably mounted within said housing. As the mounting of each of these elements is the same, only one of such mountings will be described. The boring element 2 is mounted in bearings 3, 4, and 5 of the housing as shown in Figure 3. Fixedly secured to the boring element 2 intermediate the bearings 4 and 5 is a pinion 6 which meshes with a gear 7 carried by a shaft 8. The gear 7 in turn meshes with a gear 9 carried by the shaft 10, the said gear 9 being also in meshing engagement with the gear 11 carried by a shaft 12. The gear 11 meshes with a pinion 13 fixedly mounted on a hexagonal shaft 14 as shown in Figure 5.

To one end of the hexagonal shaft 14 is coupled a hollow tube 15 by means of a coupling 17. The tube 15 is of larger cross-sectional area than the shaft 14 as clearly shown in Figure 3. Fixedly mounted in the free end of the tube 15 is a nut 241 Figures 15 and 16 whose inner peripheral surface is of hexagonal contour, and slidably mounted in such nut is a hexagonal shaft 16. The hexagonal shaft 16 extends into transmission casing 18 and is rotatably mounted therein. On this shaft 16 is mounted a gear 19 which meshes with a gear 20 carried by a shaft 21. Mounted upon the shaft 21 and fixedly keyed to the gear 20 is a gear 22 which meshes with a gear 23 carried by a shaft 24. The shaft 24 also carries a gear 25 which meshes with a pinion 26 Figures 18 and 19 carried by a shaft 27 of the motor 28.

By reference to Figures 3 and 15 it will be seen that surrounding the portion of the hexagonal shaft 16 which is within the transmission casing 18 is a sleeve 29. Mounted in surrounding relation with the sleeve 29 is a hollow tube 33 which has a threaded portion 34. Into the free end of the tube 33 telescopes the free end of the hollow tube 15.

As clearly shown in Figures 16 and 17 in threaded engagement with the threaded portion 34 is a travelling nut 36 which is fixedly secured to the inner peripheral surface of a hollow tube 37 by means of pins 38. Carried by the pins 38 is a roller assembly 39. On the threaded portion 34 at a point suitably spaced from the nut 36 is a collar 40 Figure 3 which acts to maintain such threaded portion in aligned position within the tube 37. The end of the tube 37 opposite the travelling nut 36 extends into the projection 41 of the housing 1 and is fixedly secured thereto.

As illustrated in Figure 15 on the sleeve 29 are keyed a nest of gears 30, 31, and 32 which are of varying diameters. Carried by a shaft 45 Figures 18, 21, and 22 are a nest of gears 46, 47, and 48 which are likewise of varying diameters. This last-named nest of gears is in alignment with but in reverse complemental relation with the nest of gears 30, 31, and 32. A gear 49 carried by a loose shaft 50 is shiftable to a position such that it will mesh with any pair of opposed gears of the respective nest of gears previously described. For example, it may be made to mesh with gears 31 and 47, as clearly shown in Figures 21 and 22. The mechanism for shifting the loose shaft 50 to the meshing position desired for the gear 49 with the opposed pair of nest of gears comprises as shown in Figures 19, 21, and 22 a bearing 51 provided with a forked extension 52 carried by the shaft 50 which forked extension engages with and rides along an angularly disposed track 53. The bearing pin 51 has a loose collar 54 which is secured thereto by means of a pin 55. Extending through the collar 54 is a slidable arm 56 which is secured to one end of a pin 57 mounted in the lower portion of the transmission casing 18, and surrounding the pin 57 and bearing against the arm 56 and the inside surface of the transmission casing 18 is a spring 58. To the opposite end of the pin 57 Figure 21 is secured an arm 59 which has its free end locked to the transmission casing 18 by means of a pin 60 being inserted in any one of the holes 61 Figure 23 in the transmission casing. The holes 61 are spaced in such manner as to correspond with the meshing position of gear 49 with any one of the opposed pairs of the respective nests of gears. On the top of the pin 57 is securedly fixed a knob 62 for operating the pin and arm 59. The pin 57 is provided with a cut out portion 63 which receives the end of locking pin 64 extending through an opening in the transmission casing 18 as shown in Figure 23.

As shown in Figures 18, 19, and 20 on the shaft 45 carrying the nest of gears 46, 47, and 48, there is also mounted a gear 65 which meshes with a gear 66 attached to and forming a part of the loose part of the forward friction disk clutch 67 loosely mounted on the shaft 68. The shaft 68 also carries a gear 69 which meshes with a pinion 70 carried by the shaft 24. The shaft 24 is connected to the pinion 26 of the motor shaft 27 through the medium of gear 25 as previously described.

Carried by the shaft 45 is also a gear 71 Figure 20 which meshes with an intermediate gear 72 Figures 19 and 24 carried by the stub shaft 73. The gear 72 in turn meshes with a gear 74 Figures 20 and 24 which is attached to and is a part of the loose part of the reverse friction disk clutch 75 loosely mounted on shaft 68. The shaft 68 is connected to the pinion 26 Figure 19 of the motor shaft 27 through the medium of gear 69, pinion 70, and gear 26 on shaft 24.

On shaft 68 Figures 18 and 20 in complemental relation with the loose part 67 of the forward friction disk clutch is fixedly mounted the slidable part 76 of such friction disk clutch which is connected to one end of a rod 77 by the pin and yoke connection 78. To the opposite end of said rod 77 which protrudes out of the transmission casing 18 is secured a hand lever 79 which is pivotally connected to a brace member 80. The hand lever 79 is for the purpose of operating the clutch.

Fixedly mounted upon the shaft 68 Figure 20 is the slidable part 81 of the reverse friction disk clutch in complemental relation with the loose part 75 of such clutch. The slidable part 81 is connected to one end of the hollow tube 82 by means of the pin and yoke connection 83. As shown in Figures 20 and 26, the tube 82 is in surrounding relation with respect to rod 77, and has its opposite free end protruding out of the transmission casing 18 to which is secured a hand lever 84, said lever being pivotally connected to a brace member 85. The hand lever 84 operates the reverse clutch.

As shown in Figure 20, the tube 82 is provided with collars 86 and 87 disposed adjacent the yoke members 78 and 83 respectively. Attached to the collar 86 and bearing against yoke connection 78 is a compression spring 88, and a compression spring 89 having an end attached to the collar 87 which bears against yoke connection 83. Engaging with the tube 82 and movable therealong is a forked member 90 which is secured to the threaded shaft 91 which carries a sprocket 92 on one end thereof. In engagement with the sprocket 92 and extending to and engaging with a sprocket 93 carried by the end of the sleeve 29 is a sprocket chain 94. The forked member 90 is moved forward or backward along the tube 82 by this sprocket mechanism until it bears against either of the collars 86 or 87 depending upon whether the forward or reverse clutch is in operative relation to automatically disengage the respective clutch.

As will be apparent from Figures 2 and 8, the boring elements 2 are suitably spaced from each other and are in aligned relation. Disposed intermediate a pair of the boring elements 2 is an expansive force inducing element. Since the structure of the expansive force inducing elements is the same, the structure of only one will be described. Such element comprises a rod 95 which is provided with enlarged threaded portions 96 and 97 suitably spaced therealong as shown in Figure 10. In threaded engagement with each of the enlarged portions 96 and 97 is a nut 98 having a pointed nose 99. In complemental relation to each pointed nose 99 of the nuts 98 is mounted a squared block 100 such as shown in Figure 10. To each of the blocks 100 are pivotally connected jaw members 101 and 102 which cooperate with a pointed nose 99 of each of the nuts 98. The front pair of jaw members 101 and 102 are of the configuration shown on the right hand portion of Figure 10 and in Figures 11 and 13 while the rear pair of jaw members 101 and 102 are of the configuration shown on the left hand portion of Figure 10 and in Figure 14. The blocks 100 carrying the jaw members 101 and 102 are supported in complemental relation with respect to the pointed nose 99 of each of the nuts 98 by means of transverse guide bars 105 and 106. Mounted upon the guide bars 105 and 106 at points adjacent the blocks 100 and secured thereto, are cleaning bar members 107 for the purpose to be subsequently described.

As shown in Figure 35 the back end of the rod 95 carrying the expansive force inducing elements extends through an opening into the housing 1, and is mounted in bearings 136 and 137. On the rod 95 intermediate the bearings 136 and 137 is fixedly mounted a pinion 138 as likewise shown in Figure 35. As shown in Figure 8, there are a series of such rods 95, each of which carry a pinion 138. Each pinion 138 meshes with a gear 139 carried by a stub shaft 140. As will be apparent from Figure 6, there are six pinions 138, each of which mesh with a gear 139, and intermediate the two central gears 139 and in meshing engagement therewith is a gear 141 carried by a shaft 142. The shaft 142 Figure 3 also carries a bevel gear 143 which meshes with a bevel gear 144 mounted on the shaft 145. Mounted on the shaft 145 is also a bevel gear 146 which meshes with bevel gears 147 and 148 carried by a shaft 149, said shaft 149 being connected to the opposite end of the hexagonal shaft 14. Mounted upon the shaft 149 intermediate the bevel gears 147 and 148 is a forward and reverse clutch 150 which is attached to a shifter yoke 151 fixedly mounted on a shifter bar 152. Cooperating with the shifter yoke 151 is a travelling nut 153 which is carried by a threaded portion 154 of a shaft 155, as shown in Figure 4. The shaft 155 carries a sprocket 156 which is in engagement with a sprocket chain 157, said chain being driven by a sprocket 158 carried by the outer portion of the hub of the bevel gear 148. As shown in Figure 3, the travelling nut 153 carries a yoke member 159 having forks 160 and 161 which are slidably mounted on the shifter bar 152 in such manner that the end of the shifter yoke 151 is intermediate said forks. Thus, as the travelling nut 153 is moved along the shaft 155 one of the forks 160 or 161 is brought into engagement with the end of the shifter yoke 151 to automatically disengage the forward or reverse clutch drive of the clutch 155 depending upon the direction in which the shaft 149 is driven. To the free end of the shifter bar 152 is attached a hand lever 162 which is pivotally connected to a brace 163 carried by the projection 41 of the housing 1 for shifting the clutch 155 into operative engagement with either of bevel gears 148 and 149 to drive the shaft 149 in the desired direction.

As clearly shown in Figures 8 and 9 intermediate the central pair of the boring elements 2 and running parallel therewith is a pipe 108. The front end of such pipe is connected to a pipe 109 which is disposed transversely of the boring elements 2. Such transverse pipe is made up of a plurality of return bends connected together. Each of the return bends 110 intermediate the boring elements 2 is provided with a nozzle 111. The back end of the pipe 108 is adapted to be connected to a source of water supply as by a flexible hose 112 for the purpose to be subsequently described.

By reference to Figures 8 and 9 it will be apparent that the boring elements 2 comprise spiral bars 250 provided with auger bits 113 which are of a configuration such that they partially overlap each other. This enables the formation of contiguous communicating areas in the breast of coal or mineral which are in the form of circular holes interconnected to each other by means of passages whose upper and lower walls simulate a V-shaped rib, as clearly shown by the dotted lines in Figure 9. It is apparent that these passages permit the rods 95 carrying the expansive force inducing elements, and the guide bars 105 and 106 carrying the cleaning bars 107 together with water piping to enter into the breast of coal or mineral with the boring elements 2.

With reference to Figures 15 and 16 mounted in surrounding relation with the tube 37 is a sleeve 42 which has one end thereof extending into the transmission casing 18. Mounted upon the end of the sleeve 42 within the transmission casing 18 is the mechanism for moving the boring and expansive force inducing element assembly as a unit to a position such that the boring elements will be either in a horizontal or vertical plane. Such mechanism comprises a sleeve 114 fixedly mounted on the portion of the sleeve 42 which extends into the transmission casing 18. Carried by the sleeve 114 is a worm gear 115 which meshes with a worm 116 mounted on a shaft 117. The shaft 117 also carries a gear 118 Figure 18 which is in meshing engagement with a gear 119 mounted on a shaft 120. Mounted upon the shaft 120 is also a miter gear 121 which meshes with miter gears 122 and 123, said miter gears 122 and 123 being rotatably mounted on shaft 124. Mounted on shaft 124 intermediate the miter gears 122 and 123 and adapted to coact with either of said gears is a forward and reverse disk clutch 125. The shaft 124 also carries a gear 126 which meshes with a gear 127 rotatably mounted on shaft 128. Gear 127 meshes with and is driven by gear 19. The clutch 125 is operated by a shifter yoke 129 which is fixedly mounted on a shaft 130. The shaft 130 is slidably mounted in the transmission casing 18 and is operated by a lever 131 which is pivotally connected to a bracket 132.

As shown in Figures 3 and 15 the opposite end of the sleeve 42 extends into a projection 43 of a cap member 44 and is secured thereto, the said cap member being fixedly mounted upon the tube 37 adjacent the projection 41 of the housing 1. The cap member 44 houses a roller assembly comprising a plurality of rollers 133 whose outer peripheral surfaces correspond to the outer periphery of tube 37. Such rollers are rotatably mounted on pins 134. The roller assembly is locked to the tube 37 by means of a flexible pin device 135.

By reference to Figures 1 and 15 it will be seen that surrounding the sleeve 42 and secured to the transmission casing 18 is a supporting sleeve 165. As shown in Figures 27, 28, 29, and 30 to such sleeve 165 are hingedly connected wing brackets 166 as at 167. To one end of the wing brackets 166 is connected a trolley 172 as at 173 which trolley rides along a transversely disposed I beam track 174 supported and carried by supporting members or brackets 175. The brackets 175 are hingedly connected to brackets 176 as at 177, the said brackets 176 being secured to the upper portion of a sleeve 179 slidable upon each of the supporting standards 240. Each of the brackets 175 have a semi-circular shaped portion 180 provided with a plurality of openings 181 which may be moved into complemental relation with an opening 182 in the brackets 176, and the portions 180 and brackets 176 locked together by means of pins 183. As shown in Figure 27, each of the brackets 176 carries a cam locking device 184 for locking them in the position to which they are moved on the supporting standards 240.

To the opposite end of the wing brackets 166 is connected a trolley 185 as at 186 which trolley rides along a transversely disposed I beam track 187 supported and carried by supporting members or brackets 188. Each of brackets 188 are hingedly connected to a bracket 189 as at 190, the said bracket 189 being secured to the lower portion of the sleeve 179 which is slidable upon each of the supporting standards 240. Each of the brackets 189 has a semi-circular shaped portion 191 provided with a plurality of openings 192 which may likewise be moved into complemental relation with openings 193 in the brackets 188, and the portions 191 and brackets 188 locked together by means of pins 194.

Referring to Figures 1 and 2, it will be seen that the top ends of the supporting standards 240 are connected to side I beams 200 and 201 disposed adjacent the ceiling of the vein by means of brackets 202. The side I beams 200 and 201 are anchored to the ceiling by means of pointed screws 203 carried by brackets 204. The lower ends of the supporting standards 240 are connected to side I beams 205 and 206 of the carriage 207 by means of brackets 208. The side I beams 205 and 206 also carry brackets 209 to which are connected the lower ends of telescopic supports 210 and 211. The upper ends of each of the telescopic supports 210 are connected to the brackets 202 carried by the side I beams 200 and 201, and the upper ends of each of the telescopic supports 211 are connected to brackets 212 carried by the side I beams 200 and 201.

As will be apparent from Figure 27, each of wing brackets 166 has a semi-circular portion 168 provided with a plurality of openings 169, said portion protruding outwardly centrally from each of such brackets. The supporting sleeve 165, as shown in Figure 30, is provided with apertured lugs 170 to which are secured the portions 168 at any one of its openings 169 by means of pins 171. The purpose of this mechanism is to rigidly maintain the I beam tracks 174 and 187 in their adjusted position and also retain the combined boring and expansive force inducing element apparatus in fixed position with relation to such tracks. In addition, such mechanism has the function of counteracting the back pressure caused by the action of the boring elements while working in the breast of coal or mineral.

From Figure 27, it will be apparent that the combined boring and expansive force inducing element apparatus can be adjusted independently without disturbing the adjusted position of the I beam tracks 174 and 187 as shown in such figure. Such independent adjustment may be done by withdrawing the pins 171, moving the semicircular portions 168 in the direction such that the proper one of the openings 169 is brought into registry with the apertured lugs 170 corresponding to the position to which the apparatus has been moved, and then inserting the pins 171 through the respective registering opening and apertured lug.

Referring to Figures 1 and 15, it will be seen that the sleeve 42 also carries a sleeve 196 fixedly secured thereto which is connected to a hoist and pulley device 197. Such device comprises a motor 213 and a hoisting mechanism 214. The device 197 is carried by a trolley 215 which is supported by and rides along a transverse I beam track 216 connected to side I beams 200 and 201 by means of brackets 217. Extending from the motor 213 are chains 198 and 199 for actuating the motor so as to drive the motor shaft in a direction such as to either raise or lower the combined boring and expansive force inducing element apparatus. The device 197 acts as a supplemental support for such apparatus. Its main purpose, however, is to either raise or lower the apparatus while in its adjusted position.

As shown in Figures 1 and 2, the carriage 207 is provided with wheels 218 which ride along tracks 219 longitudinally disposed along the floor of the vein. The wheels 218 are connected to the side I beams 205 and 206 by means of brackets 220 and 221. The tracks 219 set in boots 222 and 223, and are fixedly secured thereto. To the sides of each of the boots 222 and 223 are secured yokes 224 to which are attached the lower ends of telescopic tubes 225. The upper ends of the telescopic tubes 225 engage with the ceiling of the vein and are anchored thereto by means of claw shaped shoes 226. The boots 222 are provided with an extension 227 in which is disposed one end of a jack 228. As shown in Figures 31, 32, 33, and 34 the opposite end of the jack 228 is connected to bracket 220. By turning the threaded rod 229, the threaded nut 230 travels forward or backward along the rod 229 depending upon the direction in which the said rod is turned, and thereby causes the inner tube 231 to move forwardly or backwardly within the outer tube 232 to push the bracket 220 and wheels 218 of the carriage 207 carrying the apparatus up or down along the tracks 219. The tracks 219 are provided with means for locking the carriage 207 at the stopping position, such means as illustrated in Figures 1, 32, and 33 comprising a dog 233 carried by brackets 234 secured to side I beams 205 and 206 of the carriage 207 which engages with a toothed rack 236 fixedly secured to the top of tracks 219.

As shown in Figure 1, the trolley 215 carries a chain and pulley device 235 whereby the combined boring and expansive force inducing element apparatus is moved backward and forward transversely of the vein of coal or mineral.

In operation of the apparatus according to the present invention, the operator shifts the mounting of the combined boring and expansive force inducing element apparatus to a position such that the boring elements are in a horizontal plane. This is effected by moving the lever 131 in the proper direction so as to cause the respective portion of the clutch 125 to operatively engage with its complemental miter gear 122 or 123. The rotation of the miter gear 122 or 123 causes the rotation of the sleeve 42 carrying the housing 1 with its boring and expansive force inducing element assembly by means of the miter gear 121, shaft 120, gear 119, gear 118, shaft 117, worm 116, sleeve 115, and sleeve 114. As soon as the sleeve 42 has been rotated to a degree such that the boring elements are in a horizontal plane, the operator moves the lever 131 to its initial position and thereby disengaging the clutch from its complemental miter gear 122 or 123. It is to be noted that the roller assembly 133 acts to hold the sleeve 42 in the position to which it has been moved by the rotation of the worm 115 carried by the sleeve 114.

With the boring and expansive force inducing element apparatus in a position such that the boring elements are in a horizontal plane, the operator next shifts such apparatus to a position such that the boring elements will be in a horizontal plane which is at an angle substantially parallel with the pitch of the floor of the vein. This is done by withdrawing the pins 171, 183, and 194, moving the semi-circular shaped portions 180 and 191 in the direction such that the proper one of the openings 181 and 192 is brought into registry with the openings 182 and 193 corresponding to the position to which the transverse I beam tracks 174 and 187 have been moved, and then inserting the pins 183 and 194 through the registering pair of openings 181 and 182 and pair of openings 192 and 193. Following this the semi-circular portions 168 are likewise moved in the direction such that the proper one of the openings 169 is brought into registry with the apertured lugs 170, and the pins 171 inserted through the respective registering opening and apertured lug.

After the boring and expansive force inducing element apparatus is in position such that the boring elements are in a horizontal plane which is at an angle substantially parallel with the pitch of the floor of the vein, the operator lowers the apparatus to a point such that the boring elements in their adjusted position face a multiple of the breast at the juncture point of the breast and the floor of the vein. This is done by pulling the cam locking devices 184 outwardly so as to release the brackets 176 from locking engagement with the supporting standards 240, and then pulling downwardly on the chain 198 or 199 which rotates the motor 213 in the direction that causes the hoisting mechanism 214 to lower the apparatus. As soon as the apparatus has been lowered to its desired position, the operator pulls the opposite chain to stop the motor, and then moves the cam locking devices 184 inwardly to lock the brackets 176 to the supporting standards 240.

The operator next operates the chain and pulley device 235 to shift the apparatus transversely to a position such that the boring elements are in a position to attack a multiple of the working breast extending from either one of the two lateral ribs or intermediate the lateral ribs, preferably extending from either the right or left hand lateral rib. With the boring elements in such position, the operator starts the rotation of the motor shaft 27. The rotation of the shaft 27 causes the rotation of each of the boring elements 2 through the pinions 6 carried by each of said elements. As shown in Figure 5, the pinions 6 are in mesh with each other, and such pinions are rotated in unison by means of a gear 7 which meshes with one of the pinions 6. The gear 7 is driven from the motor shaft 27 through the shaft 8, gear 9, shaft 10, gear 11, shaft 12, gear 13, hollow hexagonal shaft 14, hollow tube 15, nut 241, hexagonal shaft 16, gear 19, gear 20, shaft 21, gear 22, gear 23, shaft 24, gear 25, and pinion 26.

While the boring elements 2 are rotating, the operator connects the hose 112 to the pipe 108, and causes the supply of water to flow through hose 112 into pipe 108. At this point, the hand lever 79 is pushed inwardly so as to cause the feeding of the rotating boring elements into the breast of coal or mineral. The pushing of the lever 79 inwardly moves the driven part 76 of the friction clutch into engagement with the loose part 67 of said clutch and thereby rotates shaft 45 through the medium of gears 66 and 65. The shaft 45 drives the sleeve 29 by means of gears 47, 49, and 31. By the rotation of the sleeve 29 the nut 36 is caused to move along the threaded portion 34 of the hollow tube 33, and thereby feed hollow tube 37 carrying the housing 1 with its combined boring and expansive force inducing element apparatus forwardly into the breast of coal or mineral. The extent of travel forwardly of the nut 36 along the threaded portion 34 of the hollow tube 33 is controlled by means of the travelling yoke 90 which moves along tube 82 and threaded shaft 91 and contacts with and bears against the yoke connection 78 attached to the driven part 76 of the friction clutch at a certain point in its travel to disengage the driven part 76 from the loose part 67 of the clutch. As shown in Figures 18, 19, and 20, the travelling yoke 90 is caused to move forwardly along the threaded shaft 91 by means of sprocket 92, sprocket chain 94, and sprocket wheel 93.

The feeding of the boring elements into the face of the breast causes a plurality of spaced holes to be formed therein. Since the auger bits 113 of the boring elements 2 are of such configuration that they partially overlap each other, contiguous communicating areas are formed in the coal which are in the form of circular holes interconnected by passages whose opposite walls simulate V-shaped ribs as clearly shown by the dotted lines in Figure 9.

As the auger bits 113 of the boring elements 2 are working in the breast of coal or mineral to form the contiguous communicating areas, water is applied to the portion of the breast in which such areas are being formed by means of nozzles 111. The water serves the purpose of allaying the dust induced by the action of the auger bits and of quenching any sparks which may be produced by the auger bits striking spar. In addition, the water also acts as a cooling medium for the boring elements. It is to be noted that the veins of coal or mineral as a general thing, have pieces or particles of spar embedded therein, and such spar is of a different degree of hardness than the surrounding coal or mineral. The striking of the auger bits against such spar induces sparks which must be immediately quenched to avoid the hazard of explosion.

It is apparent that the contiguous communicating areas of the type shown in Figure 9 permit the rods 95 carrying the expansive force inducing elements 105 and 106 carrying the cleaning bar members 107 to enter into the breast of coal or mineral with the boring elements 2. Thus, as the auger bits 113 of the boring elements are working in the breast to form contiguous communicating areas, the bar members 107 cooperate with the spiral bars 250 of the boring elements 2 to effect removal of the auger bit cuttings from such areas. The bar members 107 push the auger bit cuttings into the spiral bars 250 to thereby cause such cuttings to be fed backwardly toward the face of the breast.

When the boring elements have penetrated into the coal to the desired extent which is controlled by the disengagement of the driven part 76 from the loose part 67 of the clutch by means of the travelling yoke 90, the operator pushes the lever 84 inwardly so as to cause the feeding of the rotating boring elements away from the breast. The pushing of lever 84 inwardly moves the driven part 81 of the reverse clutch into engagement with the loose part 75 of the clutch, and thereby rotates shaft 45 reversely through gears 74, 72, and 71. The shaft 45 drives the sleeve 29 by means of the gears 47, 49, and 31 in the opposite direction to thereby feed the hollow tube 37 carrying the housing 1 backwardly and away from the breast. The extent of travel of the nut 36 reversely along the threaded portion 34 of the hollow tube 33 is controlled by means of the same travelling yoke 90 previously described but at a certain point in its reverse travel, the aforesaid yoke contacts with and bears against the yoke connection 83 attached to the driven part 81 of the reverse clutch to disengage the driven part 81 from the loose part 75 of the reverse clutch.

If desired, the speed at which the boring elements are fed toward and away from the breast of coal or mineral may be increased or decreased as desired. This may be done by shifting gear 49 into engagement with either of complemental pairs of gears 30 and 46, or 32 and 48. The shifting of gear 49 is effected by pulling outwardly on the knob 62 and then turning such knob in such direction that the forked bearing 52 will slide along the track 53 to the desired extent by means of pin 57 and arm 56. The gear 49 is then locked in its adjusted position by means of arm 59 and pin 60 as clearly shown in Figure 21.

When the boring elements have been retracted to their initial position, the operator actuates the chain and pulley device 235 to an extent sufficient to shift the apparatus to a point such that the boring elements are in a position to attack another multiple of the breast along the juncture point of the breast and floor of the vein, and repeats the feeding and withdrawing operations of the boring elements previously described. This is continued until a fissure or undercut has been formed which extends partially or completely, preferably completely, across the breast at this point. This fissure or undercut severs the coal from the bed rock of the floor.

Upon completion of the fissure or undercut at the base of the breast, the operator moves the lever 131 in the proper direction so as to cause the respective portion of the clutch 125 to operatively engage with its complemental miter gear 122 or 123 and rotate the sleeve 42 carrying the housing 1, and thereby move the boring elements to a position such that they are in a vertical plane adjacent the line of joinder between a lateral rib and the breast. With the boring elements thus positioned, the operator repeats the feeding and withdrawing operations of the boring elements previously described. The apparatus is then elevated to a position such that the boring elements are approximately just above the portion containing the bored contiguous communicating areas or holes but in the same vertical plane. This is effected by pulling the cam locking devices 184 outwardly, actuating the hoist and pulley device 197 and then pushing the devices 184 inwardly, whereupon the feeding and withdrawing operations of the boring elements are again repeated. This is repeated successively until the coal or mineral along the lateral rib has been punctured from the floor to the roof of the vein, thereby forming a side cut. When this is completed, it is preferable to puncture the coal along the opposite lateral rib from the floor to the roof. This is done in the same manner as described for forming the side cut along the other lateral rib. The side cuts fracture the cleavage of the coal along the lateral ribs.

Upon completion of the formation of the side cut, the operator moves the lever 131 in the proper direction so as to cause the respective portion of the clutch 125 to operatively engage with its complemental miter gear 122 or 123 and rotate the sleeve 42 carrying the housing 1, and thereby return the boring elements to a position such that they are in a horizontal plane. Then, the cam locking devices 184 are pulled outwardly, the hoist and pulley device 197 actuated to lower the apparatus to a point such that the boring elements will be at a point spaced from the fissure or undercut, and the cam locking devices 184 pushed inwardly, whereupon the chain and pulley device 235 is actuated to an extent sufficient to shift the apparatus to a point such that the boring elements are in a position to attack a multiple of the working breast extending from either one of the two lateral ribs or intermediate the two ribs, preferably to a position extending from one of the side cuts. At this point, the operator repeats the feeding operation of the boring elements into the face of the breast as previously described. When the boring has progressed to the point where the boring elements have penetrated into the coal or mineral to the full extent of their length, the operator moves the lever 162 in the proper direction so as to cause the respective portion of the clutch 150 operatively engage with its complemental bevel gear 148 or 149 and thereby actuate the expansive force inducing elements. The engagement of the respective portion of the clutch 150 with its complemental bevel gear 148 or 149 causes the rotation of each of the rods 95 through pinions 138 carried by each of said rods. As shown in Figure 6, each of the pinions 138 is in meshing engagement with a gear 139, and the gears 139 are driven by a gear 141 carried by a shaft 142. The shaft 142 is driven through the medium of bevel gear 143, bevel gear 144, shaft 145, bevel gear 146, and either of bevel gears 148 or 149 as shown in Figures 3 and 35. As the rods 95 are rotated, the pointed nose 99 of each of the nuts 98 is moved forwardly into contact with the inner surfaces of the jaw members 101 and 102 and presses against such members to such a degree as to cause the jaw members to extend outwardly and bear against the V-shaped walls of interconnecting passages of the contiguous areas. The pressing of the jaw members against the V-shaped walls of the interconnecting passages induce expansive forces to be exerted upon the coal in the region of such areas which in themselves and unsupplemented by any auxiliary disruptive forces are of sufficient magnitude to break away and dislodge the coal or mineral in the region of such areas in sizable pieces with a minimum of fines and undersized particles. In other words, these expansive forces break away and dislodge the coal in the space bounded by the fissure or undercut and the portion of the plane in which the contiguous communicating areas are being formed. It is to be noted that the extent of rotation of the rods 95 is controlled by the nut 153 travelling along the threaded portion 154 of the shaft 155 until one of the forks 160 or 161 of the nut 153 is brought into engagement with the shifter yoke 151 whereupon the clutch 155 is disengaged and the rotation of the rods 95 is stopped. As soon as the rotation of the rods 95 is stopped, the operator moves the lever 162 in the proper direction so as to cause the respective portion of the clutch 150 to operatively engage with its complemental bevel gear 148 or 149 and thereby retract the expansive force inducing elements to their normal positions by the mechanism previously described. At this point the operator repeats the withdrawing operation of the boring elements.

When the boring elements have been retracted to their initial feeding position, the operator actuates the chain and pulley device 235 to an extent sufficient to shift the apparatus to a point such that the boring elements are in position to attack another multiple of the breast adjacent the portion just broken away and dislodged. It is to be understood that the boring elements are merely moved to a position in the same plane and still are positioned at an angle substantially parallel to the pitch of the floor of the vein. The operator then repeats the feeding and withdrawing operations of the boring elements and actuates the expansive force inducing elements at the completion of each feeding operation of the boring elements as previously described. This is continued until the coal has been broken away and dislodged clear across this plane. The operator then shifts the boring elements to a plane above and spaced from the first plane and then causes such elements to operate in turn upon multiple portions of the breast along such plane until the coal or mineral bounded by such plane and the first plane has been mined. This is continued until all of the coal or mineral in the face of the breast has been broken away and dislodged.

After the entire face of the breast has been mined, the carriage 207 carrying the apparatus is moved forwardly along the tracks 219 by means of jacks 228 to a position such that the apparatus can again attack the breast of coal in the manner previously described.

The apparatus of this application is an improvement over applicant's Patent No. 2,089,944, Method of mining and apparatus therefor, which issued on August 17, 1937.

While the apparatus has been described for the mining of hard coal found in strata or veins which run at an angle with respect to the surface of the ground, it is to be understood that it is also applicable to the mining of other minerals, for example gold bearing ores, which occur in strata or veins of like nature.

Having fully described the invention, what I claim as new and desire to secure by Letters Patent is:

1. In an apparatus for the mining of coal or similar mineral, a plurality of rotatable boring elements arranged in spaced and aligned relation for boring contiguous communicating areas in the face of the breast of coal or mineral, and bar members interposed between said boring elements and so positioned as to act as guides for directing the cuttings on to said boring elements to thereby cause the boring elements to convey the cuttings backwardly toward the face of the breast.

2. In an apparatus for the mining of coal or similar mineral, a plurality of spiral boring rods provided with boring bits arranged in spaced and aligned relation for boring contiguous communicating areas in the face of the breast of coal or mineral, and bar members intermediate said boring rods and disposed so as to act as guides for directing the cuttings produced by the boring bits in the formation of said areas on to the spiral boring rods to thereby cause the boring rods to convey the cuttings backwardly toward the face of the breast.

3. In an apparatus for the mining of coal or similar mineral, a plurality of rotatable boring elements arranged in spaced and aligned relation for boring contiguous communicating areas in the face of the breast of coal or mineral, means in cooperative relation with said boring elements for applying water to said elements and said areas to allay the dust induced by the action of the boring elements in the formation of such areas and to quench any sparks which may be produced by the boring elements striking spar, and bar members interposed between said boring elements so positioned as to act as guides for directing the cuttings on to said boring elements to thereby cause the boring elements to convey the cuttings backwardly toward the face of the breast.

4. In an apparatus for the mining of coal or similar mineral, a plurality of rotatable boring elements arranged in spaced and aligned relation for boring contiguous communicating areas in the face of the breast of coal or mineral, spraying means in cooperative relation with said boring elements for applying water to said elements and said areas to allay the dust induced by the action of the boring elements in the formation of such areas and to quench any sparks which may be produced by the boring elements striking spar, and bar members intermediate said boring elements and disposed so as to act as guides for directing the cuttings on to said boring elements to thereby cause the boring elements to convey the cuttings backwardly toward the face of the breast.

5. In an apparatus for the mining of coal or similar mineral, a plurality of spiral boring rods provided with boring bits arranged in spaced and aligned relation for boring contiguous communicating areas in the face of the breast of coal or mineral, bar members interposed between said boring rods and coacting therewith for directing the cuttings produced by the action of the boring bits in the formation of said areas into the spiral boring bars to thereby cause the cuttings to be fed backwardly toward the face of the breast, and spraying means in cooperative relation with said boring bars for applying water to said boring bits and said areas to allay the dust induced by the action of the boring bits and to quench any sparks which may be produced by the boring bits striking spar.

6. In an apparatus for the mining of coal or similar mineral, a plurality of rotatable boring elements arranged in spaced and aligned relation for boring contiguous communicating areas in the face of a breast of coal or mineral which has an undercut at the juncture point of the floor and breast and a side cut along the joinder point of a lateral rib and breast in a plane substantially parallel with the pitch of the floor of the vein and spaced from said undercut, bar members interposed between said boring elements so positioned as to act as guides for directing the cuttings on to said boring elements to thereby cause the boring elements to convey the cuttings backwardly toward the face of the breast, and means in association with said boring elements for applying to the walls of said areas at points intermediate the axes of said boring elements expansive forces which in themselves are of such magnitude as to break away the coal or mineral in the region of such areas in sizable pieces with a minimum of fines and undersized particles.

7. In an apparatus for the mining of coal or similar mineral, a plurality of rotatable boring elements arranged in spaced and aligned relation for boring contiguous communicating areas in the face of a breast of coal or mineral which has an undercut at the juncture point of the floor and breast and a side cut along the joinder point of a lateral rib and breast in a plane substantially parallel with the pitch of the floor of the vein and spaced from said undercut, means embodying expansible jaw members in association with said boring elements, bar members interposed between said boring elements so positioned as to act as guides for directing the cuttings on to said boring elements to thereby cause the boring elements to convey the cuttings backwardly toward the face of the breast, and means for causing said jaw members to press against the walls of said areas at points intermediate the axes of said boring elements to thereby exert upon the walls of said areas expansive forces which in themselves are of such magnitude as to break away the coal or mineral in the region of such areas in sizable pieces with a minimum of fines and undersized particles.

8. In an apparatus for the mining of coal or similar mineral, a plurality of rotatable boring elements arranged in spaced and aligned relation for boring contiguous communicating areas in the face of a breast of coal or mineral which has an undercut at the juncture point of the floor and breast and a side cut along the joinder point of a lateral rib and breast in a plane substantially parallel with the pitch of the floor of the vein and spaced from said undercut, means in cooperative relation with said boring elements for applying water to said boring elements and said areas to allay the dust induced by action of the boring elements and to quench any sparks which may be produced by the boring elements striking spar, and bar members interposed between said boring elements so positioned as to act as guides for directing the cuttings on to said boring elements to thereby cause the boring elements to convey the cuttings backwardly toward the face of the breast, and means in association with said boring elements for applying to the walls of said areas at points intermediate the axes of said boring elements expansive forces which in themselves are of such magnitude as to break away the coal or mineral in the region of such areas in sizable pieces with a minimum of fines and undersized particles.

9. In an apparatus for the mining of coal or similar mineral, a plurality of rotatable boring elements arranged in spaced and aligned relation for boring contiguous communicating areas in the face of a breast of coal or mineral which has an undercut at the juncture point of the floor and breast and a side cut along the joinder point of a lateral rib and breast in a plane substantially parallel with the pitch of the floor of the vein and spaced from said undercut, spraying means in cooperative relation with said boring elements for applying water to said boring elements and said areas to allay the dust induced by the action of the boring elements and to quench any sparks which may be produced by the boring elements striking spar, means embodying expansible jaw members in association with said boring elements, bar members interposed between said boring elements so positioned as to act as guides for directing the cuttings on to said boring elements to thereby cause the boring elements to convey the cuttings backwardly toward the face of the breast, and means for causing said jaw members to press against the walls of said areas at points intermediate the axes of said boring elements to thereby exert upon the walls of said areas expansive forces which in themselves are of such magnitude as to break away the coal or mineral in the region of such areas in sizable pieces with a minimum of fines and undersized particles.

10. In an apparatus for the mining of coal or similar mineral, a plurality of spiral boring rods provided with boring bits arranged in spaced and aligned relation for boring contiguous communicating areas in the face of a breast of coal or mineral which has an undercut at the juncture point of the floor and breast and a side cut along the joinder point of a lateral rib and breast in a plane substantially parallel with the pitch of the floor of the vein and spaced from said undercut, means embodying expansible jaw members in association with said boring rods, bar members intermediate said boring rods and disposed so as to act as guides for directing the cuttings produced by the boring bits in the formation of said areas on to the spiral boring rods to thereby cause the boring rods to convey the cuttings backwardly toward the face of the breast, spraying means in cooperative relation with said boring rods for applying water to said boring bits and said areas to allay the dust induced by the action of the boring bits and to quench any sparks which may be produced by the boring bits striking spar, and means for causing said jaw members to press against the walls of said areas at points intermediate the axes of said boring rods to thereby exert upon the walls of said areas expansive forces which in themselves are of such magnitude as to break away the coal or mineral in the region of such areas in sizable pieces with a minimum of fines and undersized particles.

11. In an apparatus for the mining of coal or similar mineral, a housing, a plurality of rotatable boring elements arranged in spaced and aligned relation mounted in said housing and having an end extended through a wall thereof, a casing enclosing a gear mechanism, and means interposed between said housing and said casing for operatively connecting said boring elements to said gear mechanism, said means comprising a shaft, a hollow tube coupled to one end of said shaft, a nut fixedly secured within the other end of said tube, a second shaft slidably mounted within said nut and having an end thereof extending into said casing and rotatably mounted therein, a second hollow tube mounted in surrounding relation to said second shaft and carrying a travelling nut on its outer peripheral surface, and a third hollow tube surrounding said travelling nut and having an end secured thereto and its opposite end extending into said housing and fixedly secured thereto.

12. In an apparatus for the mining of coal or similar mineral, a housing, a plurality of rotatable boring elements arranged in spaced and aligned relation mounted in said housing and having an end extended through a wall thereof, a casing enclosing a gear mechanism, and means interposed between said housing and said casing for operatively connecting said boring elements to said gear mechanism, said means comprising a shaft, a hollow tube coupled to one end of said shaft, a nut fixedly secured within the other end of said tube, a second shaft slidably mounted within said nut and having an end thereof extending into said casing and rotatably mounted therein, a second hollow tube mounted in surrounding relation to said second shaft and carrying a travelling nut on its outer peripheral surface, a third hollow tube surrounding said travelling nut and having an end secured thereto and its opposite end extending into said housing and fixedly secured thereto, and means carried by said second hollow tube for maintaining said tube in aligned position within said third hollow tube.

13. In an apparatus for the mining of coal or similar mineral, a housing, a plurality of rotatable boring elements arranged in spaced and aligned relation mounted in said housing and having an end extended through a wall thereof, a casing enclosing a gear mechanism, and means interposed between said housing and said casing for operatively connecting said boring elements to said gear mechanism, said means comprising a hexagonal shaft, a hollow tube coupled to one end of said shaft, a nut having its inner peripheral surface of hexagonal contour fixedly secured within the other end of said tube, a second hexagonal shaft slidably mounted within said nut and having an end thereof extending into said casing and rotatably mounted therein, a sleeve surrounding the portion of said second named hexagonal shaft within said casing, a second hollow tube having a threaded portion on its exterior peripheral surface mounted in surrounding relation with said sleeve and enclosing the free end of said first named hollow tube, a second nut mounted on said threaded portion for travel therealong, and a third hollow tube surrounding said second nut and having an end thereof fixedly secured to such second nut and its opposite end thereof extending into said housing and fixedly secured thereto.

14. In an apparatus for the mining of coal or similar mineral, a housing, a plurality of rotatable boring elements arranged in spaced and aligned relation mounted in said housing and having an end extended through a wall thereof, a casing enclosing a gear mechanism, and means interposed between said housing and said casing for operatively connecting said boring elements to said gear mechanism, said means comprising a hexagonal shaft, a hollow tube of larger cross-sectional area than said shaft coupled to one end of said shaft, a nut having its inner peripheral surface of hexagonal contour fixedly secured within the other end of said tube, a second hexagonal shaft slidably mounted within said nut and having an end thereof extending into said casing and rotatably mounted therein, a sleeve surrounding the portion of said second named hexagonal shaft within said casing, a second hollow tube having a threaded portion on its exterior peripheral surface mounted in surrounding relation with said sleeve and enclosing the free end of said first named hollow tube, a second nut mounted on said threaded portion for travel therealong, a third hollow tube surrounding said second nut and having an end thereof fixedly secured to such second nut and its opposite end thereof extending into said housing and fixedly secured thereto, and a collar in threaded engagement with the threaded portion of said second hollow tube at a point suitably spaced from said second nut to maintain such threaded portion in aligned position within said third hollow tube.

15. In an apparatus for the mining of coal or similar mineral, a housing, a plurality of rotatable boring elements arranged in spaced and aligned relation mounted in said housing and having an end extended through a wall thereof, a casing enclosing a gear mechanism, and means interposed between said housing and said casing for operatively connecting said boring elements to said gear mechanism, said means comprising a hexagonal shaft, a hollow tube coupled to one end of said shaft, a nut having its inner peripheral surface of hexagonal contour fixedly secured within the other end of said tube, a second hexagonal shaft slidably mounted within said nut and having an end thereof extending into said casing and rotatably mounted therein, a sleeve surrounding the portion of said second shaft within said casing, a second hollow tube having a threaded portion on its exterior peripheral surface mounted in surrounding relation with said sleeve and enclosing the free end of said first named hollow tube, a second nut on said threaded portion for travel therealong, a third hollow tube surrounding said second nut and having an end thereof fixedly secured to such second nut and its opposite end thereof extending into said housing and fixedly secured thereto, a nest of gears of varying diameters carried by said sleeve, and gearing within said casing associated with said nest of gears for rotating said second hollow tube in either direction at a predetermined rate to thereby feed the boring elements toward and away from the breast.

16. In an apparatus for the mining of coal or similar mineral, a housing, a plurality of rotatable boring elements arranged in spaced and aligned relation mounted in said housing and having an end extended through a wall thereof, a casing enclosing a gear mechanism, and means interposed between said housing and said casing for operatively connecting said boring elements to said gear mechanism, said means comprising a hexagonal shaft, a hollow tube of larger cross-sectional area than said shaft coupled to one end of said shaft, a nut having its inner peripheral surface of hexagonal contour fixedly secured within the other end of said tube, a second hexagonal shaft slidably mounted within said nut and having an end thereof extending into said casing and rotatably mounted therein, a sleeve surrounding the portion of said second shaft within said casing, a second hollow tube having a threaded portion on its exterior peripheral surface mounted in surrounding relation with said sleeve and enclosing the free end of said first named hollow tube, a second nut on said threaded portion for travel therealong, a third hollow tube surrounding said second nut and having an end thereof fixedly secured to such second nut and its opposite end thereof extending into said housing and fixedly secured thereto, a collar in threaded engagement with the threaded portion of said second hollow tube at a point suitably spaced from said second nut to maintain such threaded portion in aligned position within said third hollow tube, a nest of gears of varying diameters carried by said sleeve, and gearing within said casing associated with said nest of gears for rotating said second hollow tube in either direction at a predetermined rate to thereby feed the boring elements toward and away from the breast.

17. In an apparatus for the mining of coal or similar mineral, a housing, a plurality of rotatable boring elements arranged in spaced and aligned relation mounted in said housing and having an end extended through a wall thereof, a shaft within said housing, a gear carried by said shaft, gearing connecting each of said boring elements to said gear, a hollow tube coupled to one end of said shaft, a nut fixedly secured within the other end of said tube, a casing, a second shaft slidably mounted within said nut and having an end thereof extending into said casing and rotatably mounted therein, a gear mounted upon the end of said second shaft adjacent the end thereof within said casing, and gearing within said casing operatively connected to said gear whereby rotation is imparted to said boring elements.

18. In an apparatus for the mining of coal or similar mineral, a housing, a plurality of rotatable boring elements arranged in spaced and aligned relation mounted in said housing and having an end extended through a wall thereof, a hexagonal shaft within said housing, a gear carried by said shaft, gearing connecting each of said boring elements to said gear, a hollow tube coupled to one end of said shaft, a nut having its inner peripheral surface of hexagonal contour fixedly secured within the other end of said tube, a casing, a second hexagonal shaft slidably mounted within said nut and having an end thereof extending into said casing and rotatably mounted therein, a gear mounted upon the end of said second shaft adjacent the end thereof within said casing, and gearing within said casing operatively connected to said gear whereby rotation is imparted to said boring elements.

19. In an apparatus for the mining of coal or similar mineral, a housing, a plurality of rotatable boring elements arranged in spaced and aligned relation mounted in said housing and having an end extended through a wall thereof, a shaft within said housing, a gear carried by said shaft, gearing in said housing connecting each of said boring elements to said gear, a hollow tube coupled to one end of said shaft, a nut fixedly secured within the other end of said tube, a casing, a second shaft slidably mounted within said nut and having an end thereof extending into said casing and rotatably mounted therein, a gear mounted upon the end of said second shaft adjacent the end thereof within said casing, gearing within said casing operatively connected to said last named gear whereby rotation is imparted to said boring elements, a second hollow tube mounted in surrounding relation to said second shaft and carrying a travelling nut on its outer peripheral surface, a third hollow tube surrounding said travelling nut and having an end secured thereto and its opposite end extending into said housing and fixedly secured thereto, a nest of gears carried by the portion of said second shaft within said casing, and gearing within said casing associated with said nest of gears for rotating said second hollow tube in either direction at a predetermined rate to thereby feed the boring elements toward and away from the breast.

20. In an apparatus for the mining of coal or similar mineral, a housing, a plurality of rotatable boring elements arranged in spaced and aligned relation mounted in said housing and having an end extended through a wall thereof, a shaft within said housing, a gear carried by said shaft, gearing in said housing connecting each of said boring elements to said gear, a hollow tube coupled to one end of said shaft, a nut fixedly secured within the other end of said tube, a casing, a second shaft slidably mounted within said nut and having an end thereof extending into said casing and rotatably mounted therein, a gear mounted upon the end of said second shaft adjacent the end thereof within said casing, gearing within said casing operatively connected to said last named gear whereby rotation is imparted to said boring elements, a second hollow tube mounted in surrounding relation to said second shaft and carrying a travelling nut on its outer peripheral surface, a third hollow tube surrounding said travelling nut and having an end secured thereto and its opposite end extending into said housing and fixedly secured thereto, a travelling collar carried by said second hollow tube at a point suitably spaced from said travelling nut to maintain such second hollow tube in aligned position within said third hollow tube, a nest of gears carried by the portion of said second shaft within said casing, and gearing within said casing associated with said nest of gears for rotating said second hollow tube in either direction at a predetermined rate to thereby feed the boring elements toward and away from the breast.

21. In an apparatus for the mining of coal or similar mineral, a housing, a plurality of rotatable boring elements arranged in spaced and aligned relation mounted in said housing and having an end extended through a wall thereof, a hexagonal shaft within said housing, a gear carried by said shaft, gearing in said housing connecting each of said boring elements to said gear, a hollow tube coupled to one end of said shaft protruding from said housing, a nut having its inner peripheral surface of hexagonal contour fixedly secured within the other end of said tube, a casing, a second hexagonal shaft slidably mounted within said nut and having an end thereof extending into said casing and rotatably mounted therein, a gear mounted upon the end of said second shaft adjacent the end thereof within said casing, gearing within said casing operatively connected to said last named gear whereby rotation is imparted to said boring elements, a sleeve surrounding the portion of said second shaft within said casing, a second hollow tube having a threaded portion on its exterior peripheral surface mounted in surrounding relation with said sleeve and enclosing the free end of said first named hollow tube, a second nut mounted on said threaded portion for travel therealong, a third hollow tube surrounding said second nut and having an end thereof fixedly secured to said second nut and its opposite end thereof extending into said housing and fixedly secured thereto, a nest of gears of varying diameters carried by said sleeve, and gearing within said casing associated with said nest of gears for rotating said second hollow tube in either direction at a predetermined rate to thereby feed the boring elements toward and away from the breast.

22. In an apparatus for the mining of coal or similar mineral, a housing, a plurality of rotatable boring elements arranged in spaced and aligned relation mounted in said housing and having an end extended through a wall thereof, a hexagonal shaft within said housing, a gear carried by said shaft, gearing in said housing connecting each of said boring elements to said gear, a hollow tube coupled to one end of said shaft protruding from said housing, a nut having its inner peripheral surface of hexagonal contour fixedly secured within the other end of said tube, a casing, a second hexagonal shaft slidably mounted within said nut and having an end thereof extending into said casing and rotatably mounted therein, a gear mounted upon the end of said second shaft adjacent the end thereof within said casing, gearing within said casing operatively connected to said last named gear whereby rotation is imparted to said boring elements, a sleeve surrounding the portion of said second shaft within said casing, a second hollow tube having a threaded portion on its exterior peripheral surface mounted in surrounding relation with said sleeve and enclosing the free end of said first named hollow tube, a second nut mounted on said threaded portion for travel therealong, a third hollow tube surrounding said second nut and having an end thereof fixedly secured to said second nut and its opposite end thereof extending into said housing and fixedly secured thereto, a collar in threaded engagement with the threaded portion of said second hollow tube at a point suitably spaced from said second nut to maintain such threaded portion in aligned position within said third hollow tube, a nest of gears of varying diameters carried by said sleeve, and gearing within said casing associated with said nest of gears for rotating said second hollow tube in either direction at a predetermined rate to thereby feed the boring elements toward and away from the breast.

23. In an apparatus for the mining of coal or similar mineral, a housing, a plurality of rotatable boring elements arranged in spaced and aligned relation mounted in said housing and having an end extended through a wall thereof, a casing enclosing a gear mechanism, a tubular member enclosing the actuating mechanism connecting said boring elements to said gear mechanism interposed between said housing and said casing, said tubular member comprising a hollow tube extending from said housing, and a sleeve having an end extending from said casing surrounding said tube and secured thereto, a second sleeve carried by the end of said sleeve within said casing, a gear carried by said second sleeve, means for rotating said gear in either direction to thereby move said tubular member to a position such that the boring elements will be in a horizontal or vertical plane, and means interposed between the connection of said hollow tube with said first named sleeve to thereby hold said tubular member in the position to which it has been moved.

24. In an apparatus for the mining of coal or similar mineral, a housing, a plurality of rotatable boring elements arranged in spaced and aligned relation mounted in said housing and having an end extended through a wall thereof, a casing enclosing a gear mechanism, a tubular member enclosing the actuating mechanism connecting said boring elements to said gear mechanism interposed between said housing and said casing, said tubular member comprising a hollow tube extending from said housing, and a sleeve having an end extending from said casing surrounding said tube and secured thereto, a second sleeve carried by the end of said sleeve within said casing, a worm gear carried by said second sleeve, a shaft, a second worm gear carried by said shaft and in engagement with said first named worm gear, a gear carried by said shaft and suitably spaced from said second worm gear, gear mechanism operably connected to said gear for rotating said gear in either direction to thereby move said tubular member to a position such that the boring elements will be in a horizontal or vertical plane, and means interposed between the connection of said hollow tube with said first named sleeve to thereby hold said tubular member in the position to which it has been moved.

25. In an apparatus for the mining of coal or similar mineral, a housing, a plurality of rotatable boring elements arranged in spaced and aligned relation mounted in said housing and having an end extended through a wall thereof, a casing enclosing a gear mechanism, a tubular member enclosing the actuating mechanism connecting said boring elements to said gear mechanism interposed between said housing and said casing, said tubular member comprising a hollow tube extending from said housing, and a sleeve having an end extending from said casing surrounding said tube and secured thereto, a second sleeve carried by the end of said sleeve within said casing, a worm gear carried by said second sleeve, a shaft, a second worm gear carried by said shaft and in engagement with first named worm gear, a gear carried by said shaft and suitably spaced from said second worm gear, a second shaft, a gear carried by said second shaft and in engagement with said gear carried by the first named shaft, a miter gear carried by said second shaft and suitably spaced from said second named gear, a third shaft carrying a pair of miter gears suitably spaced from each other, said first named miter gear being in meshing engagement with said pair of miter gears, a double acting clutch interposed between said pair of miter gears and carried by said third shaft, gear mechanism operably connected to said third named shaft for causing rotation thereof, and means operatively connected to said clutch for causing the rotation of said sleeve in either direction to thereby rotate said tubular member to a position such that the boring elements will be in a horizontal or vertical plane.

26. In an apparatus for the mining of coal or similar mineral, a housing, a plurality of rotatable boring elements arranged in spaced and aligned relation mounted in said housing and having an end extended through a wall thereof, a casing enclosing a gear mechanism, a tubular member enclosing the actuating mechanism connecting said boring elements to said gear mechanism interposed between said housing and said casing, said tubular member comprising a hollow tube extending from said housing, and a sleeve having an end extending from said casing surrounding said tube and secured thereto, a second sleeve carried by the end of said sleeve within said casing, a worm gear carried by said second sleeve, a shaft, a second worm gear carried by said shaft and in engagement with said first named worm gear, a gear carried by said shaft and suitably spaced from said second worm gear, a second shaft, a gear carried by said second shaft and in engagement with said gear carried by the first named shaft, a miter gear carried by said second shaft and suitably spaced from said second named gear, a third shaft carrying a pair of miter gears suitably spaced from each other, said first named miter gear being in meshing engagement with said pair of miter gears, a double acting clutch interposed between said pair of miter gears and carried by said third shaft, gear mechanism operably connected to said third named shaft for causing rotation thereof, means operatively connected to said clutch for causing the rotation of said sleeve in either direction to thereby rotate said tubular member to a position such that the boring elements will be in a horizontal or vertical plane, and roller means interposed between the connection of said hollow tube with said first named sleeve to thereby hold said tubular member in the position to which it has been moved.

27. In an apparatus for the mining of coal or similar mineral, a housing, a plurality of rotatable boring elements arranged in spaced and aligned relation mounted in said housing and having an end extended through a wall thereof, a casing enclosing a gear mechanism, a tubular member enclosing the actuating mechanism connecting said boring elements to said gear mechanism interposed between said housing and said casing, a supporting sleeve surrounding said tubular member, supporting standards, a wing bracket disposed on each side of said sleeve and hingedly connected thereto, an apertured bracket surrounding each of said standards and carried thereby, a second apertured bracket suitably spaced above said first named apertured bracket surrounding each of said standards and carried thereby, a supporting member hingedly connected to each of the said first and second named apertured brackets, I beam tracks extending transversely between each of the lower and upper disposed pair of said supporting members and carried thereby, and a trolley carried by each end of said wing brackets and mounted for travel along said I beam tracks whereby the boring elements as a unit are supported in the breast at an angle substantially parallel with the pitch of the floor of the vein.

28. In an apparatus for the mining of coal or similar mineral, a housing, a plurality of rotatable boring elements arranged in spaced and aligned relation mounted in said housing and having an end extended through a wall thereof, a casing enclosing a gear mechanism, a tubular member enclosing the actuating mechanism connecting said boring elements to said gear mechanism interposed between said housing and said casing, a supporting sleeve surrounding said tubular member, supporting standards, a wing bracket disposed on each side of said sleeve and hingedly connected thereto, an apertured bracket surrounding each of said standards and carried thereby, a second apertured bracket suitably spaced above said first named apertured bracket surrounding each of said standards and carried thereby, a supporting member hingedly connected to each of the said first and second named apertured brackets, I beam tracks extending transversely between each of the lower and upper disposed pair of said supporting members and carried thereby, a trolley carried by each end of said wing brackets and mounted for travel along said I beam tracks, each of said supporting members having a semi-circular shaped portion provided with a plurality of openings therealong and movable so that any one of its openings may be shifted into complemental relation with the aperture in each of said apertured brackets to thereby shift said boring elements as a unit to a position such that they are at an angle substantially parallel with the pitch of the floor of the vein, and means for locking said semi-circular shaped portions and apertured brackets in their aligned complemental relation.

29. In an apparatus for the mining of coal or similar mineral, a housing, a plurality of rotatable boring elements arranged in spaced and aligned relation mounted in said housing and having an end extended through a wall thereof, a casing enclosing a gear mechanism, a tubular member enclosing the actuating mechanism connecting said boring elements to said gear mechanism interposed between said housing and said casing, a supporting sleeve surrounding said tubular member, supporting standards, a wing bracket disposed on each side of said sleeve and hingedly connected thereto, an apertured bracket surrounding each of said standards and carried thereby, a second apertured bracket suitably spaced above said first named apertured bracket surrounding each of said standards and carried thereby, means for locking and unlocking each of said second named apertured brackets to said standards, a supporting member hingedly connected to each of the said first and second named apertured brackets, I beam tracks extending transversely between each of the lower and upper disposed pair of said supporting members and carried thereby, a trolley carried by each end of said wing brackets and mounted for travel along said I beam tracks, each of said supporting members having a semi-circular shaped portion provided with a plurality of openings therealong and movable so that any one of its openings may be shifted into complemental relation with the aperture in each of said apertured brackets to thereby shift said boring elements as a unit to a position such that they are at an angle substantially parallel with the pitch of the floor of the vein, and means for locking said semi-circular shaped portions and apertured brackets in their aligned complemental relation.

30. In an apparatus for the mining of coal or similar mineral, a housing, a plurality of rotatable boring elements arranged in spaced and aligned relation mounted in said housing and having an end extended through a wall thereof, a casing enclosing a gear mechanism, a tubular member enclosing the actuating mechanism connecting said boring elements to said gear mechanism interposed between said housing and said casing, a supporting sleeve provided with an apertured lug on each of its sides surrounding said tubular member, supporting standards, a wing bracket disposed on each side of said sleeve and hingedly connected thereto, an apertured bracket surrounding each of said standards and carried thereby, a second apertured bracket suitably spaced above said first named apertured bracket surrounding each of said standards and carried thereby, a supporting member hingedly connected to each of the first and second named apertured brackets, I beam tracks extending transversely between each of the lower and upper disposed pair of said supporting members and carried thereby, a trolley carried by each end of said wing brackets and mounted for travel along said I beam tracks whereby the boring elements as a unit are supported in the breast at an angle substantially parallel with the pitch of the floor of the vein, each of said wing brackets having a semi-circular shaped portion provided with a plurality of openings therealong and movable so that any one of its openings may be shifted into complemental relation with the aperture in said apertured lug, and means for locking said semi-circular shaped portions and apertured lugs in their aligned complemental relation thereby rigidly maintaining the boring elements in their adjusted angular plane position and counteracting the back pressure exerted by the boring elements while working in the breast of coal or mineral.

31. In an apparatus for the mining of coal or similar mineral, a housing, a plurality of rotatable boring elements arranged in spaced and aligned relation mounted in said housing and having an end extended through a wall thereof, a casing enclosing a gear mechanism, a tubular member enclosing the actuating mechanism connecting said boring elements to said gear mechanism interposed between said housing and said casing, a supporting sleeve provided with an apertured lug on each of its sides surrounding said tubular member, supporting standards, a wing bracket disposed on each side of said sleeve and hingedly connected thereto, an apertured bracket surrounding each of said standards and carried thereby, a second apertured bracket suitably spaced above said first named apertured bracket surrounding each of said standards and carried thereby, means for locking and unlocking each of said second named apertured brackets to said standards, a supporting member hingedly connected to each of the first and second named apertured brackets, I beam tracks extending transversely between each of the lower and upper disposed pair of said supporting members and carried thereby, a trolley carried by each end of said wing brackets and mounted for travel along said I beam tracks whereby the boring elements as a unit are supported in the breast at an angle substantially parallel with the pitch of the floor of the vein, each of said wing brackets having a semi-circular shaped portion provided with a plurality of openings therealong and movable so that any one of its openings may be shifted into complemental relation with the aperture in said apertured lug, and means for locking said semi-circular shaped portions and apertured lugs in their aligned complemental relation thereby rigidly maintaining the boring elements in their adjusted angular plane position and counteracting the back pressure exerted by the boring elements while working in the breast of coal or mineral.

32. In an apparatus for the mining of coal or similar mineral, a housing, a plurality of rotatable boring elements arranged in spaced and aligned relation mounted in said housing and having an end extended through a wall thereof, a casing enclosing a gear mechanism, a tubular member enclosing the actuating mechanism connecting said boring elements to said gear mechanism interposed between said housing and said casing, a supporting sleeve provided with an apertured lug on its sides surrounding said tubular member, supporting standards, a wing bracket disposed on each side of said sleeve and hingedly connected thereto, an apertured bracket surrounding each of said standards and carried thereby, a second apertured bracket suitably spaced above said first named apertured bracket surrounding each of said standards and carried thereby, a supporting member hingedly connected to each of the first and second named apertured brackets, I beam tracks extending transversely between each of the lower and upper disposed pair of said supporting members and carried thereby, a trolley carried by each end of said wing brackets and mounted for travel along said I beam tracks, each of said supporting members having a semi-circular shaped portion provided with a plurality of openings therealong and movable so that any one of its openings may be shifted into complemental relation with the aperture in each of said apertured brackets to thereby shift said boring elements as a unit to a position such that they are at an angle substantially parallel with the pitch of the floor of the vein, means for locking said portions and apertured brackets in their aligned complemental relation, each of said wing brackets having a semi-circular shaped portion provided with a plurality of openings therealong and movable so that any one of its openings may be shifted into complemental relation with an aperture in said apertured lug, and means for locking said last named portions and apertured lugs in their aligned complemental relation thereby rigidly maintaining the boring elements in their adjusted angular plane position and counteracting the back pressure exerted by the boring elements while working in the breast of coal or mineral.

33. In an apparatus for the mining of coal or similar mineral, a housing, a plurality of rotatable boring elements arranged in spaced and aligned relation mounted in said housing and having an end extended through a wall thereof, a casing enclosing a gear mechanism, a tubular member enclosing the actuating mechanism connecting said boring elements to said gear mechanism interposed between said housing and said casing, a supporting sleeve provided with an apertured lug on its sides surrounding said tubular member, supporting standards, a wing bracket disposed on each side of said sleeve and hingedly connected thereto, an apertured bracket surrounding each of said standards and carried thereby, a second apertured bracket suitably spaced above said first named apertured bracket surrounding each of said standards and carried thereby, means for locking and unlocking each of said second named apertured brackets to said standards, a supporting member hingedly connected to each of the first and second named apertured brackets, I beam tracks extending transversely between each of the lower and upper disposed pair of said supporting members and carried thereby, a trolley carried by each end of said wing brackets and mounted for travel along said I beam tracks, each of said supporting members having a semi-circular shaped portion provided with a plurality of openings therealong and movable so that any one of its openings may be shifted into complemental relation with the aperture in each of said apertured brackets to thereby shift said boring elements as a unit to a position such that they are at an angle substantially parallel with the pitch of the floor of the vein, means for locking said portions and apertured brackets in their aligned complemental relation, each of said wing brackets having a semi-circular shaped portion provided with a plurality of openings therealong and movable so that any one of its openings may be shifted into complemental relation with an aperture in said apertured lug, and means for locking said last named portions and apertured lugs in their aligned complemental relation thereby rigidly maintaining the boring elements in their adjusted angular plane position and counteracting the back pressure exerted by the boring elements while working in the breast of coal or mineral.

34. In an apparatus for the mining of coal or similar mineral, a housing, a plurality of rotatable boring elements arranged in spaced and aligned relation mounted in said housing and having an end extended through a wall thereof, a casing enclosing a gear mechanism, a tubular member enclosing the actuating mechanism connecting said boring elements to said gear mechanism interposed between said housing and said casing, a supporting sleeve surrounding said tubular member, supporting standards, a wing bracket disposed on each side of said sleeve and hingedly connected thereto, an apertured bracket surrounding each of said standards and carried thereby, a second apertured bracket suitably spaced above said first named apertured bracket surrounding each of said standards and carried thereby, a supporting member hingedly connected to each of the said first and second named apertured brackets, I beam tracks extending transversely between each of the lower and upper disposed pair of said supporting members and carried thereby, a trolley carried by each end of said wing brackets and mounted for travel along said I beam tracks whereby the boring elements as a unit are supported in the breast at an angle substantially parallel with the pitch of the floor of the vein, and means for raising and lowering said tubular member to thereby shift the boring elements while in their adjusted angular position to any position intermediate the roof and floor of the vein.

35. In an apparatus for the mining of coal or similar mineral, a housing, a plurality of rotatable boring elements arranged in spaced and aligned relation mounted in said housing and having an end extended through a wall thereof, a casing enclosing a gear mechanism, a tubular member enclosing the actuating mechanism connecting said boring elements to said gear mechanism interposed between said housing and said casing, a supporting sleeve surrounding said tubular member supporting standards, a wing bracket disposed on each side of said sleeve and hingedly connected thereto, an apertured bracket surrounding each of said standards and carried thereby, a second apertured bracket suitably spaced above said first named apertured bracket surrounding each of said standards and carried thereby, a supporting member hingedly connected to each of the said first and second named apertured brackets, I beam tracks extending transversely between each of the lower and upper disposed pair of said supporting members and carried thereby, a trolley carried by each end of said wing brackets and mounted for travel along said I beam tracks, each of said supporting members having a semi-circular shaped portion provided with a plurality of openings therealong and movable so that any one of its openings may be shifted into complemental relation with the aperture in each of said apertured brackets to thereby shift said boring elements as a unit to a position such that they are at an angle substantially parallel with the pitch of the floor of the vein, means for locking said semi-circular shaped portions and apertured brackets in their aligned complemental relation, and means for raising and lowering said tubular member to thereby shift the boring elements while in their adjusted angular position to any position intermediate the roof and floor of the vein.

36. In an apparatus for the mining of coal or similar mineral, a housing, a plurality of rotatable boring elements arranged in spaced and aligned relation mounted in said housing and having an end extended through a wall thereof, a casing enclosing a gear mechanism, a tubular member enclosing the actuating mechanism connecting said boring elements to said gear mechanism interposed between said housing and said casing, a supporting sleeve provided with an apertured lug on each of its sides surrounding said tubular member, supporting standards, a wing bracket disposed on each side of said sleeve and hingedly connected thereto, an apertured bracket surrounding each of said standards and carried thereby, a second apertured bracket suitably spaced above said first named apertured bracket surrounding each of said standards and carried thereby, a supporting member hingedly connected to each of the first and second named apertured brackets, I beam tracks extending transversely between each of the lower and upper disposed pair of said supporting members and carried thereby, a trolley carried by each end of said wing brackets and mounted for travel along said I beam tracks whereby the boring elements as a unit are supported in the breast at an angle substantially parallel with the pitch of the floor of the vein, each of said wing brackets having a semi-circular shaped portion provided with a plurality of openings therealong and movable so that any one of its openings may be shifted into complemental relation with the aperture in said apertured lug, means for locking said semi-circular shaped portions and apertured lugs in their aligned complemental relation thereby rigidly maintaining the boring elements in their adjusted angular plane position and counteracting the back pressure exerted by the boring elements while working in the breast of coal or mineral, and means for raising and lowering said tubular member to thereby shift the boring elements while in their adjusted angular position to any position intermediate the roof and floor of the vein.

37. In an apparatus for the mining of coal or similar mineral, a housing, a plurality of rotatable boring elements arranged in spaced and aligned relation mounted in said housing and having an end extended through a wall thereof, a casing enclosing a gear mechanism, a tubular member enclosing the actuating mechanism connecting said boring elements to said gear mechanism interposed between said housing and said casing, a supporting sleeve surrounding said tubular member, supporting standards, a wing bracket disposed on each side of said sleeve and hingedly connected thereto, an apertured bracket surrounding each of said standards and carried thereby, a second apertured bracket suitably spaced above said first named apertured bracket surrounding each of said standards and carried thereby, a supporting member hingedly connected to each of the said first and second named apertured brackets, I beam tracks extending transversely between each of the lower and upper disposed pair of said supporting members and carried thereby, a trolley carried by each end of said wing brackets and mounted for travel along said I beam tracks whereby the boring elements as a unit are supported in the breast at an angle substantially parallel with the pitch of the floor of the vein, means for shifting the tubular member transversely to thereby shift the boring elements while in their adjusted position to any position intermediate the lateral ribs, and means for raising and lowering the boring elements in their adjusted angular position to any position intermediate the roof and floor of the vein.

38. In an apparatus for the mining of coal or similar mineral, a housing, a plurality of rotatable boring elements arranged in spaced and aligned relation mounted in said housing and having an end extended through a wall thereof, a casing enclosing a gear mechanism, a tubular member enclosing the actuating mechanism connecting said boring elements to said gear mechanism interposed between said housing and said casing, a supporting sleeve surrounding said tubular member, supporting standards, a wing bracket disposed on each side of said sleeve and hingedly connected thereto, an apertured bracket surrounding each of said standards and carried thereby, a second apertured bracket suitably spaced above said first named apertured bracket surrounding each of said standards and carried thereby, a supporting member hingedly connected to each of the said first and second named apertured brackets, I beam tracks extending transversely between each of the lower and upper disposed pair of said supporting members and carried thereby, a trolley carried by each end of said wing brackets and mounted for travel along said I beam tracks, each of said supporting members having a semi-circular shaped portion provided with a plurality of openings therealong and movable so that any one of its openings may be shifted into complemental relation with the aperture in each of said apertured brackets to thereby shift said boring elements as a unit to a position such that they are at an angle substantially parallel with the pitch of the floor of the vein, means for locking said semi-circular shaped portions and apertured brackets in their aligned complemental relation, means for shifting the tubular member transversely to thereby shift the boring elements while in their adjusted position to any position intermediate the lateral ribs, and means for raising and lowering the boring elements in their adjusted angular position to any position intermediate the roof and floor of the vein.

39. In an apparatus for the mining of coal or similar mineral, a housing, a plurality of rotatable boring elements arranged in spaced and aligned relation mounted in said housing and having an end extended through a wall thereof, a casing enclosing a gear mechanism, a tubular member enclosing the actuating mechanism connecting said boring elements to said gear mechanism interposed between said housing and said casing, a supporting sleeve provided with an apertured lug on each of its sides surrounding said tubular member, supporting standards, a wing bracket disposed on each side of said sleeve and hingedly connected thereto, an apertured bracket surrounding each of said standards and carried thereby, a second apertured bracket suitably spaced above said first named apertured bracket surrounding each of said standards and carried thereby, a supporting member hingedly connected to each of the first and second named apertured brackets, I beam tracks extending transversely between each of the lower and upper disposed pair of said supporting members and carried thereby, a trolley carried by each end of said wing brackets and mounted for travel along said I beam tracks whereby the boring elements as a unit are supported in the breast of an angle substantially parallel with the pitch of the floor of the vein, each of said wing brackets having a semi-circular shaped portion provided with a plurality of openings therealong and movable so that any one of its openings may be shifted into complemental relation with the aperture in said apertured lug, means for locking said semi-circular shaped portions and apertured lugs in their aligned complemental relation thereby rigidly maintaining the boring elements in their adjusted angular plane position and counteracting the back pressure exerted by the boring elements while working in the breast of coal or mineral, means for shifting the tubular member transversely to thereby shift the boring elements while in their adjusted position to any position intermediate the lateral ribs, and means for raising and lowering the boring elements in their adjusted angular position to any position intermediate the roof and floor of the vein.

40. In an apparatus for the mining of coal or similar mineral, a plurality of rotatable boring elements arranged in spaced and aligned relation for boring contiguous communicating areas in the face of a breast of coal or mineral which has an undercut at the juncture point of the floor and breast and a side cut along the joinder point of a lateral rib and breast in a plane substantially parallel with the pitch of the floor of the vein and spaced from said undercut, means embodying rods carrying expansive force inducing elements in association with said boring elements, and means for causing said expansive force inducing elements to press against the walls of said areas at points intermediate the axes of said boring elements to thereby exert upon the walls of said areas expansive forces which in themselves are of such magnitude as to break away the coal or mineral in the region of such areas in sizable pieces with a minimum of fines and undersized particles, said last named means comprising a gear carried by each of said rods, a shaft, a pair of bevel gears carried by said shaft and suitably spaced from each other, a forward and reverse acting clutch mounted on said shaft intermediate said pair of bevel gears, a shifter yoke connected to said clutch, a sprocket carried by the outer portion of the hub of one of said bevel gears, gearing connecting said sprocket and said bevel gears to the gears on each of said rods, and means for actuating said shifter yoke to move the forward or reverse portion of said clutch into operative engagement with its complemental bevel gear to thereby cause the expansive force applying elements to press against the walls of said areas or be returned to their normal position.

41. In an apparatus for the mining of coal or similar mineral, a plurality of rotatable boring elements arranged in spaced and aligned relation for boring contiguous communicating areas in the face of a breast of coal or mineral which has an undercut at the juncture point of the floor and breast and a side cut along the joinder point of a lateral rib and breast in a plane substantially parallel with the pitch of the floor of the vein and spaced from said undercut, means embodying rods carrying expansive force inducing elements in association with said boring elements, and means for causing said expansive force inducing elements to press against the walls of said areas at points intermediate the axes of said boring elements to thereby exert upon the walls of said areas expansive forces which in themselves are of such magnitude as to break away the coal or mineral in the region of such areas in sizable pieces with a minimum of fines and undersized particles, said last named means comprising a gear carried by each of said rods, a shaft, a pair of bevel gears carried by said shaft and suitably spaced from each other, a forward and reverse acting clutch mounted on said shaft intermediate said pair of bevel gears, a shifter yoke connected to said clutch, a sprocket carried by the outer portion of the hub of one of said bevel gears, gearing connecting said sprocket and said bevel gears to the gears on each of said rods, means for actuating said shifter yoke to move the forward or reverse portion of said clutch into operative engagement with its complemental bevel gear to thereby cause the expansive force applying elements to press against the walls of said areas or be returned to their normal position, and means for stopping the rotation of said shaft when the expansive force inducing elements have reached full operative or inoperative position.

42. In an apparatus for the mining of coal or similar mineral, a plurality of rotatable boring elements arranged in spaced and aligned relation for boring contiguous communicating areas in the face of a breast of coal or mineral which has an undercut at the juncture point of the floor and breast and a side cut along the joinder point of a lateral rib and breast in a plane substantially parallel with the pitch of the floor of the vein and spaced from said undercut, rods carrying expansive force inducing elements intermediate said boring elements and in association therewith, each rod having a plurality of said elements at points spaced therealong, each of said elements comprising a pair of jaw members and a wedge member movable into and out of engagement therewith, and means for moving said wedge member in between said jaw members to cause said jaw members to press against the walls of said areas at points intermediate the axes of said boring elements to thereby exert upon the walls of said areas expansive forces which in themselves are of such magnitude as to break away the coal or mineral in the region of such areas in sizable pieces with a minimum of fines and undersized particles, said means comprising a gear carried by each of said rods, a shaft, a pair of bevel gears carried by said shaft and suitably spaced from each other, a forward and reverse acting clutch mounted on said shaft intermediate said pair of bevel gears, a shifter yoke connected to said clutch, a sprocket carried by the outer portion of the hub of one of said bevel gears, gearing connecting said sprocket and said bevel gears to the gears on each of said rods, and means for actuating said shifter yoke to move the forward or reverse portion of said clutch into operative engagement with its complemental bevel gear to thereby cause each of said wedge members to move in between its complemental pair of jaw members or to retract each of said wedge members.

43. In an apparatus for the mining of coal or similar mineral, a plurality of rotatable boring elements arranged in spaced and aligned relation for boring contiguous communicating areas in the face of a breast of coal or mineral which has an undercut at the juncture point of the floor and breast and a side cut along the joinder point of a lateral rib and breast in a plane substantially parallel with the pitch of the floor of the vein and spaced from said undercut, rods carrying expensive force inducing elements intermediate said boring elements and in association therewith, each rod having a plurality of said elements at points spaced therealong, each of said elements comprising a pair of jaw members and a wedge member movable into and out of engagement therewith, and means for moving said wedge member in between said jaw members to cause said jaw members to press against the walls of said areas at points intermediate the axes of said boring elements to thereby exert upon the walls of said areas expansive forces which in themselves are of such magnitude as to break away the coal or mineral in the region of such areas in sizable pieces with a minimum of fines and undersized particles, said means comprising a gear carried by each of said rods, a shaft, a pair of bevel gears carried by said shaft and suitably spaced from each other, a forward and reverse acting clutch mounted on said shaft intermediate said pair of bevel gears, a second shaft provided with a threaded portion, a nut mounted for travel along said threaded portion, a stub shaft, a pair of yokes slidably mounted on said stub shaft and secured to said nut, a shifter yoke mounted intermediate said pair of yokes on said stub shaft and connected to said clutch, a sprocket carried by the outer portion of the hub of one of said bevel gears, gearing connecting said sprocket and said bevel gears to the gears on each of said rods, and means for actuating said shifter yoke to move the forward or reverse portion of said clutch into operative engagement with its complemental bevel gear to thereby cause each of said wedge members to move into or out of engagement with its complemental pair of jaw members and to stop the movement of said wedge members when reaching the limit of their operative or inoperative positions.

44. In an apparatus for the mining of coal or similar mineral, a housing, a plurality of rotatable boring elements arranged in spaced and aligned relation mounted in said housing and having an end extended through a wall thereof, a casing enclosing a gear mechanism, a tubular member enclosing the actuating mechanism connecting said boring elements to said gear mechanism interposed between said housing and said casing, a supporting sleeve surrounding said tubular member, a carriage, supporting standards secured to said carriage and carried thereby, means for connecting said sleeve to said standards and for supporting said tubular member in the vein adjacent the face of the breast in a position such that the boring elements are at an angle substantially parallel with the pitch of the floor of the vein, I beams extending longitudinally and carried by the top of said standards, an I beam track extending transversely between said I beams and carried thereby, a second supporting sleeve suitably spaced from said first named supporting sleeve surrounding said tubular member, and a hoist and pulley device carried by said I beam track and connected to said second supporting sleeve for raising and lowering said tubular members to thereby shift the boring elements while in their adjusted angular position to any position intermediate the roof and floor of the vein.

45. In an apparatus for the mining of coal or similar mineral, a housing, a plurality of rotatable boring elements arranged in spaced and aligned relation mounted in said housing and having an end extended through a wall thereof, a casing enclosing a gear mechanism, a tubular member enclosing the actuating mechanism connecting said boring elements to said gear mechanism interposed between said housing and said casing, a supporting sleeve surrounding said tubular member, a carriage, supporting standards secured to said carriage and carried thereby, means for connecting said sleeve to said standards and for supporting said tubular member in the vein adjacent the face of the breast in a position such that the boring elements are at an angle substantially parallel with the pitch of the floor of the vein, I beams extending longitudinally and carried by the top of said standards, an I beam track extending transversely between said I beams and carried thereby, a second supporting sleeve suitably spaced from said first named supporting sleeve surrounding said tubular member, a hoist and pulley device carried by said I beam track and connected to said second supporting sleeve for raising and lowering said tubular members to thereby shift the boring elements while in their adjusted angular position to any position intermediate the roof and floor of the vein, and means carried by said I beam track for shifting said tubular member transversely to thereby move the boring elements while in their adjusted angular position to any position intermediate the lateral ribs.

EDGAR M. CADWALLADER.